United States Patent
Kahn et al.

(10) Patent No.: US 10,853,836 B2
(45) Date of Patent: Dec. 1, 2020

(54) UNIFIED PAYMENT AND RETURN ON INVESTMENT SYSTEM

(71) Applicant: Groupon, Inc., Chicago, IL (US)

(72) Inventors: Jadam Kahn, Chicago, IL (US); Mike Aparicio, Chicago, IL (US); Michael Hines, Chicago, IL (US); Shafiq Shariff, Chicago, IL (US); Todd Webb, Wheaton, IL (US); Derek Nordquist, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 180 days.

(21) Appl. No.: 13/841,347

(22) Filed: Mar. 15, 2013

(65) Prior Publication Data

US 2014/0046757 A1  Feb. 13, 2014

Related U.S. Application Data

(60) Provisional application No. 61/682,762, filed on Aug. 13, 2012.

(51) Int. Cl.
  *G06Q 30/02* (2012.01)
(52) U.S. Cl.
  CPC ..... *G06Q 30/0242* (2013.01); *G06Q 30/0247* (2013.01)
(58) Field of Classification Search
  USPC ..................................................... 705/14.46
  See application file for complete search history.

(56) References Cited

U.S. PATENT DOCUMENTS

| | | |
|---|---|---|
| 7,065,494 B1 | 6/2006 | Evans |
| 7,689,456 B2 | 3/2010 | Schroeder et al. |
| 7,949,633 B1 | 5/2011 | Shaver et al. |
| 10,235,696 B1 | 3/2019 | L'Huillier et al. |
| 2004/0093296 A1 | 5/2004 | Phelan et al. |
| 2004/0260588 A1 | 12/2004 | Bowen |
| 2007/0265980 A1* | 11/2007 | Sehgal ........................... 705/59 |
| 2009/0204490 A1 | 8/2009 | Squillace et al. |
| 2009/0234710 A1 | 9/2009 | Belgaied Hassine et al. |
| 2010/0042533 A1 | 2/2010 | Rose et al. |
| 2010/0145773 A1 | 6/2010 | Desai et al. |
| 2012/0004975 A1 | 1/2012 | Satyavolu et al. |
| 2012/0117153 A1 | 5/2012 | Gunasekar et al. |
| 2012/0209673 A1 | 8/2012 | Park |

(Continued)

OTHER PUBLICATIONS

Communication for International Application No. PCT/US2013/054714 dated Dec. 31, 2013.

(Continued)

*Primary Examiner* — Azam A Ansari
(74) *Attorney, Agent, or Firm* — Alston & Bird LLP

(57) ABSTRACT

The unified payment system, product and method provide an effective and efficient way to better communicate to a merchant the value of running a promotion and determine a deal structure that works for the merchant, the customer, the promotion system, or any combination thereof. The unified payment system, product and method provide real-time ROI calculations that a merchant and sales representative can collaboratively simultaneously work on to identify a deal structure for the merchant to select. In this way, the merchant and sales representative may arrive at a mutually acceptable payment plan.

24 Claims, 19 Drawing Sheets

(56) References Cited

U.S. PATENT DOCUMENTS

2013/0138563 A1\* 5/2013 Gilder et al. .................. 705/44
2019/0156367 A1 5/2019 Dean et al.

OTHER PUBLICATIONS

U.S. Appl. No. 13/832,804, filed Mar. 15, 2013, In re: L'Huillier entitled *Method for Determining Provider Parameters Including a Provider Margin*.
U.S. Appl. No. 61/770,174, filed Feb. 27, 2013, In re: L'Huillier entitled *Method for Determining Provider Parameters Including a Provider Margin*.
International Search Report and Written Opinion for Application No. PCT/US2013/054714 dated Mar. 7, 2014.
Pullen, N. LF, *A Strategic Analysis of an Online Coupon Firm*, Simon Fraser University (Spring 2011), 67 pages.
Tuten, T. L. et al., *Promotional Strategies for Small Businesses: Group Buying Deals*, Small Business Institute Journal, vol. 7, No. 2, (2011), pp. 15-29.
Office Action for U.S. Appl. No. 13/841,854 dated Apr. 13, 2015.
Office Action for U.S. Appl. No. 13/841,854 dated Dec. 3, 2015.

\* cited by examiner

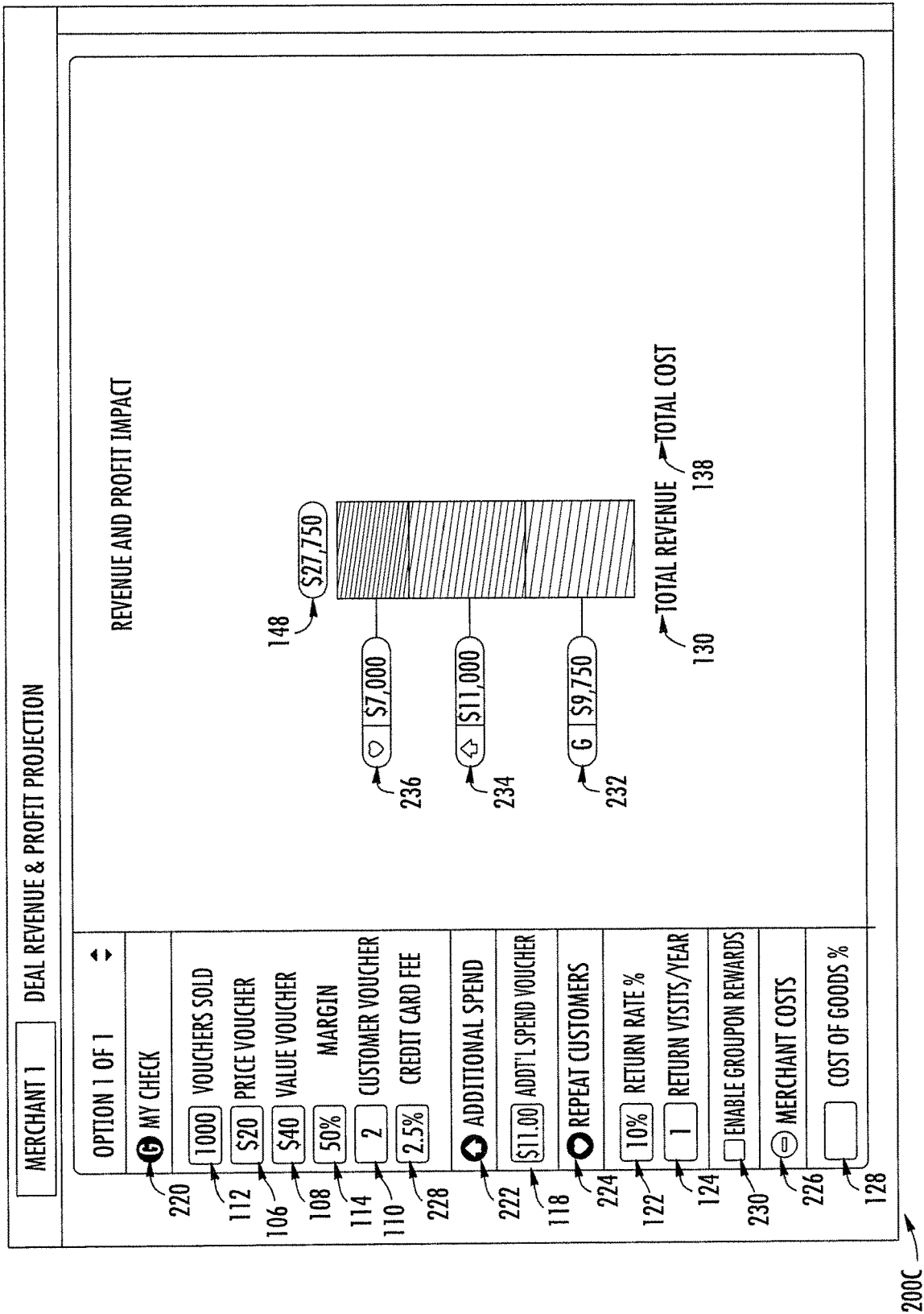

UNIFIED PAYMENT AND RETURN ON INVESTMENT SYSTEM

CROSS-REFERENCE TO RELATED APPLICATIONS

This non-provisional application claims the benefit of U.S. Provisional Patent Application No. 61/682,762, filed Aug. 13, 2012, the entire contents of which are incorporated herein by reference.

TECHNICAL FIELD

The present description relates to an effective and efficient way to better communicate the value to a merchant of running a transaction, such as a promotion, and determine a transaction structure that is conducive to the goals of the merchant, the customer, the promotion system, or any combination thereof. This description more specifically relates to how to provide real-time ROI calculations that a merchant and sales representative may collaboratively and simultaneously work on to identify a transaction structure for the merchant to select.

BACKGROUND

Promotion and marketing services often work with merchants to identify promotions to offer to potential customers. By developing appropriate promotions, merchants may increase profit, a promotion and marketing service may generate revenue, and customers may find new and interesting goods and/or services at discount prices.

After offering a promotion on behalf of a merchant, the promotion and marketing service may distribute revenue to the merchant for promotions sold to customers. However, when a customer seeks a refund of a promotion, the merchant may not be owed any money for the refunded promotion. In order to account for potential refunds, the promotion and marketing service may pay merchants less than what is fully owed. If there are refunds, the promotions system reduces the outstanding amount due to the merchant by the merchant's share of the refunded revenue (or, in the case of a merchant that has already been paid the entire amount due or that has an outstanding amount due to the promotion and marketing service, the reduction is carried over into another session: the next promotion).

Applicant has identified deficiencies and problems associated with the use of these systems. As described in detail below, Applicant has solved these identified problems by developing a solution that is embodied by the present invention.

BRIEF SUMMARY

The above-described promotion identification process is often ad hoc and may not always optimize the potential value to the various parties from promotions. Similarly, the above-described payment scheme exposes the promotion and marketing service to considerable risk if the amount of money withheld from merchants is not calculated appropriately, which can result in a lot of outstanding inventory. For example, if the merchant goes out of business, the promotion and marketing service may have to pay back all of the customers that purchased the promotion.

The unified payment and Return on Investment (ROI) system overcomes these challenges. The promotions system generates a real-time ROI as output for one or more promotions, to optimize the selection of promotions during negotiation between merchants and a promotion and marketing service. The system includes a communications interface configured to receive inputs indicative of one or more attributes of the promotion, an upsell amount exceeding a value of the promotion, and one or more indicators of repeat business in response to the promotion, and a processor in communication with the interface.

The system provides a better way to communicate the value to merchants of running a promotion and arrive at a deal structure that works for both the merchant and the promotion and marketing service. The system avoids suboptimal deals for merchants that result from the merchant's lack of understanding. The real-time ROI calculation tool allows merchants and sales representatives to collaboratively work at the same time with common visual representation, synchronized so that people can work on the tool at the same time. A sales representative can dynamically lock or unlock certain fields from merchant manipulation, may allow off-line merchant manipulation of the tool, and may enable the use of predictive wizards, analytics/demographic information, and similar promotions to help arrive at a deal structure. The real-time ROI calculation tool provides a similar view on the sales representative's side as the merchant's side, so that changes made on either side are immediately reflected by both the sales representative's side and the merchant's side. The sales representative may decide to lock certain fields to prevent a merchant from editing. The system also notifies the sales representative when a merchant opens and edits the ROI criteria.

The unified payment and ROI system further protects promotion and marketing services from potential exposure to unsecured monetary risk. Embodiments of the payment mechanism includes the following: effectively, when a sale is made in a particular period of time, the promotion and marketing service may hold back a certain configurable percentage of the revenue received from selling vouchers for promotions (such as 25%), so that there's a buffer in the bank. When the vouchers expire, the payment and marketing service may distribute the associated revenue that has been held back. The holdback amount may depend on whether the amount in the buffer is static or dynamic, and the amount may be based on the status of the underlying vouchers (e.g., whether they have expired).

The new payment mechanism is flexible, simple and easy to explain to merchants, applicable to various products, and accounts for risk (refund, out-of-business, bad merchants, fraud). The new payment mechanism is as attractive to merchants as the current payment grid, takes advantage of automation (transparent Merchant Center), provides a backwards compatible architecture, accommodates promotions with no predetermined ending, is cash flow neutral (e.g., if possible, but merchant benefits may outweigh), and provides the ability to pay for multiple promotions in a single transaction.

The payment mechanism may make initial calculation assumptions. For instance, initial payments may be disbursed to merchants a predetermined time (e.g., seven days) after the start of a feature period; payment for subsequently purchased vouchers may be forwarded on a recurring basis (e.g., the 1st and 16th of each month); and additionally, holdback payments for expired vouchers may be paid in the first recurring payment date after expiration of the vouchers (when these assumptions are not true, the average days until complete payment may be higher). Accordingly, with vouchers expiring after 180 days, 80% of the merchant share of the voucher revenue will be received by the merchant with only nominal delay, and 20% of the merchant share will be received by the merchant upon expiration of the vouchers (i.e., after 180 days), which results in complete payment for each voucher in an average of 36 days; with vouchers expiring after 90 days, there will be complete payment for each voucher in an average of 18 days. Accordingly, the payment mechanism provides business benefits, including: better merchant experience, the removal of volume caps on a deal meter, the ability to have a perpetual contract (with multiple feature periods), inventory-based payment rather than merchandising (feature periods), applicability to new products, and greater consistency of payments to merchants (rather than sending lots of payments on a seemingly random schedule).

Controls or risk management monitored and reserve calculation is updated and documented to reflect inclusion of the new terms and the calculation reflects the scope of deployment of the new terms. The system may dynamically determine and adjust the amount to withhold based on the length of redemption period, the velocity of redemptions/refunds, industry trends, the category of the promotion, and the merchant's previous performance. The system may perform withholding analysis before paying the merchant.

An initial payment may be forwarded to a merchant a configurable number of days following the start of the feature period. Thereafter, payments will be forwarded to the merchant on a recurring basis (e.g., on the 1st and 16th of each month). For example, each payment may consist of eighty percent (80%) of the total remittance amount collected from the previous period. After the voucher's promotional value expiration, the remaining twenty percent (20%), less any other refunds, shall be included with the next recurring payment to the merchant. Three easy-to-understand ways are used to tune the process according to the product: using the payment schedule, using the net percentage rules, and using the event rules.

The merchant is informed that, for example, seven days after the merchant's campaign feature period begins, the merchant may expect to receive a first payment for 80% of sales. Then twice a month the merchant will receive a payment for 80% of additional sales for the period. The merchant will receive the remaining 20% for each period, less any other refunds, when the vouchers sold in that period expire.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system, method and product may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2c shows merchant share of revenue, revenue from additional spend and repeat customer revenue calculation.

DETAILED DESCRIPTION

Figure 1:
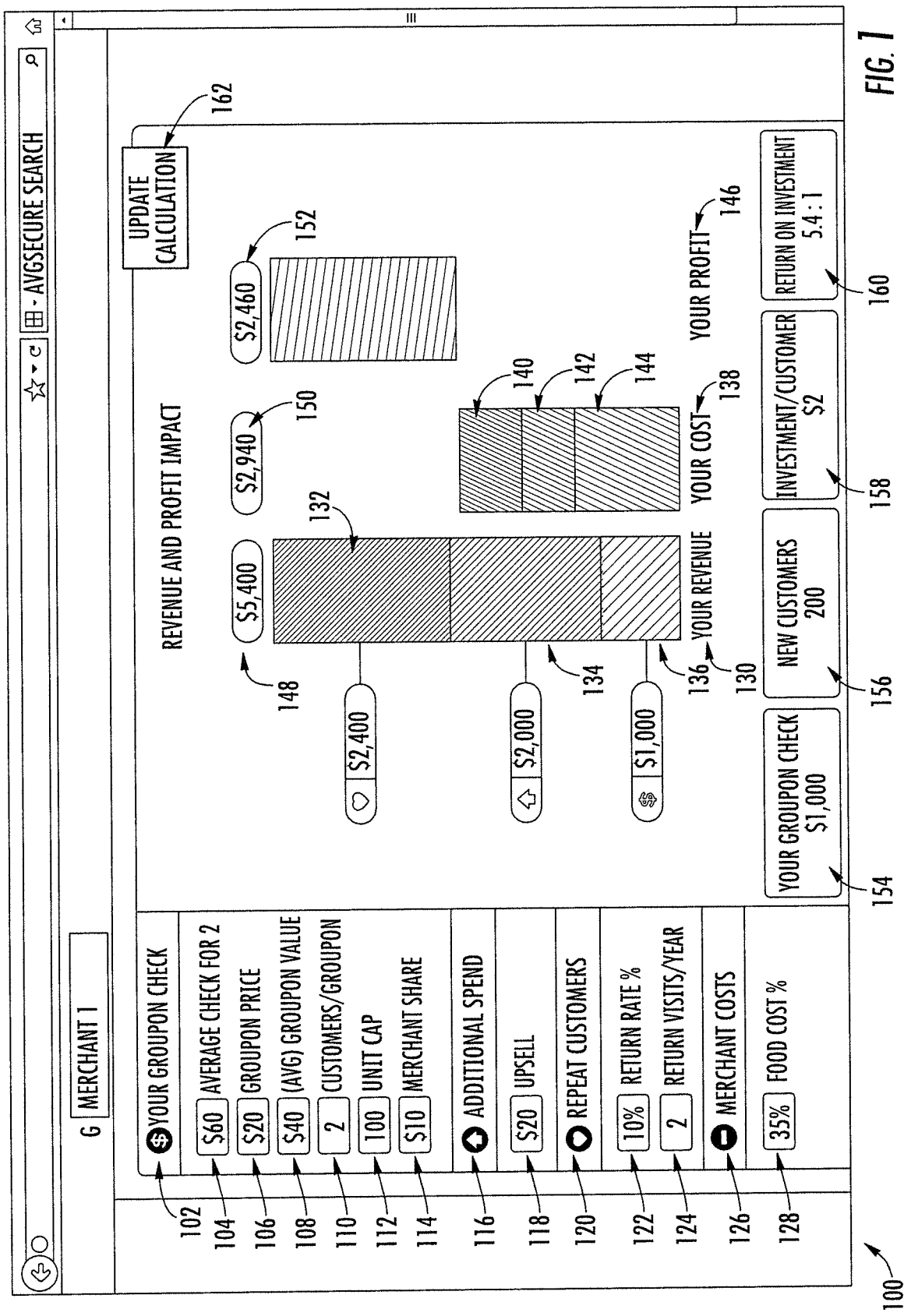
FIG. 1 shows an example graphical user interface for merchants in accordance with example embodiments.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Definitions

As used herein, a promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using a running company as the example merchant, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, using the running company promotion as an example, the accepted value is $25 and the promotional value is $50. In this example, the residual value may be equal to the accepted value.

As used herein, a promotion and marketing service may include a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue vouchers upon acceptance of an offer, participate in redemption, generate rewards, provide a point of sale device or service, issue payments to providers and/or or otherwise participate in the exchange of goods, services or experiences for currency, value and/or the like. The service may additionally process refund requests received from consumers who have been issued vouchers. For example, using the aforementioned running company promotion, a customer who has paid the service $25 for a voucher, may subsequently request a refund of the residual value of the promotion in conjunction with returning and/or otherwise invalidating the voucher. The promotion and marketing service may accordingly credit $25 to the customer and ensure that the voucher is destroyed and/or otherwise invalidated.

As used herein, a voucher may include, but is not limited to, any type of gift card, tender, electronic certificate, medium of exchange, or the like that embodies the terms of the promotion from which the voucher resulted and may be used toward at least a portion of the purchase, acquisition, procurement, consumption or the like of goods, services and/or experiences. In some examples, the voucher may take the form of tender that has a given value that is exchangeable for goods, services and/or experiences and/or a reduction in a purchase price of a particular good, service or experience. In some examples, the voucher may have multiple values, such as accepted value, a promotional value and/or a residual value. For example, using the aforementioned example of a running company, the promotional value may be received as an electronic indication in a mobile application that shows $50 to spend at the running company. In some examples, the accepted value of the voucher is defined by the value exchanged for the voucher. In some examples, the promotional value is defined by the promotion from which the voucher resulted and is the value of the voucher beyond the accepted value. In some examples, the residual value is the value after redemption, the value after the expiry or other violation of a redemption parameter, the return or exchange value of the voucher and/or the like.

As used herein, an impression may include a communication, a display, or other perceived indication, such as a flyer, print media, e-mail, text message, application alert, mobile applications, other type of electronic interface or distribution channel and/or the like, of one or more promotions. For example, using the aforementioned running company as the example provider, an impression may comprise an e-mail communication sent to consumers that indicates the availability of a $25 for $50 toward running shoes promotion.

Overview

A merchant typically has several venues in which to offer the sale of the merchants' product or service. One such venue is a website, which may assist the sale of the product or service offered by the merchant. However, it may be difficult for the merchant to determine the impact to the merchant's business of using the website. To assist in determining the impact, a Return On Investment (ROI) system may be used. The ROI system, illustrated in more detail in FIG. 4, may be a server-based system configured to receive input from multiple sources, such as from a merchant computing device and a sales representative computing device, in order to determine the impact of using the website.

For example, each of the merchant computing device and the sales representative computing device may access the server-based ROI system in order to receive a revenue and profit impact (RPI) control interface 100 (discussed in more detail in FIG. 1). The merchant, via the merchant computing device, and the sales representative for the website, via the sales representative computing device, may input different parameters relevant to the impact of the website assisting in the transaction. In turn, the ROI system is configured to receive the input from the different parties, and push the RPI of the website transaction to the merchant computing device and the website-representative computing device. In this way, the merchant and the sales representative may both contribute to the determination of the impact of the website assisting in the transaction. Further, because one, some, or all of the parameters relevant to the impact of the website assisting in the transaction are changeable, the merchant and the sales representative may change various parameters to iteratively determine the impact.

The ROI system may be integrated with different systems of the website. For example, the ROI system may communicate with a historical database illustrating historical data of previous transactions. The ROI system may access the historical database in order to populate one or more parameters relevant to the impact of the website assisting in the transaction. As another example, the ROI system may communicate with a webpage database, which may store data to generate webpages. More specifically, after the merchant and the website representative agree on the terms of the transaction, the ROI system may access the webpage database, generate a webpage using the webpage database and the agreed terms of the transaction, and present the generated webpage to the merchant, via the merchant computing device, and to the website representative, via the website representative computing device. The ROI system may, in turn, receive input (such as changes) to the generated website from the merchant or the website representative.

Figure 2:
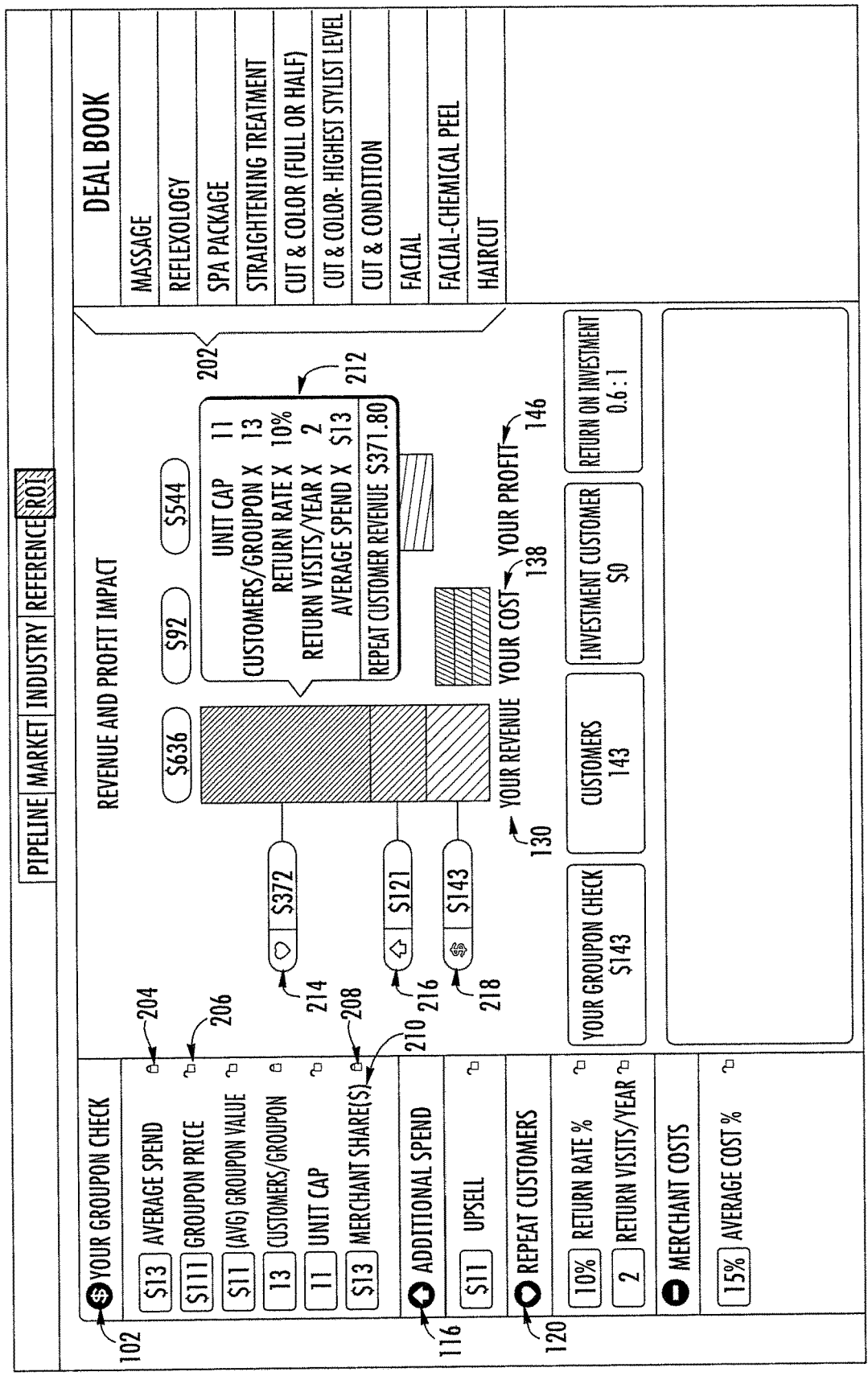
FIG. 2 shows an example revenue and profit impact control interface for sales representatives in accordance with example embodiments.

FIG. 1 shows a Revenue and Profit Impact (RPI) control interface 100 generated by the ROI system and also referred to as a return on investment (ROI) calculator for merchants. The system may generate a merchant view (as shown in FIG. 1) and a sales representative view (as shown in FIG. 2). As discussed above, the RPI control interface 100 illustrates the revenue and profit impact of using the website to assist in the merchant transaction.

As one example, the transaction may comprise a promotion facilitated by the website. In particular, the transaction may comprise a promotion in the form of a Groupon® voucher, example terms of which are illustrated in FIG. 1, from the perspective of the merchant. The terms shown in FIG. 1 are for illustration only, and other types of transactions are contemplated.

The RPI control interface 100 illustrates one or more parameters related to the promotions. For example, the RPI control interface 100 illustrates "Your Groupon Check" 102 selectable criteria, including the average check amount for two individuals 104, Groupon (voucher) Price 106, (Avg) Groupon value 108, customers per voucher 110, unit cap 112 and merchant share 114. The RPI control interface 100 provides "Additional Spend" selectable criteria 116 that includes upsell 118, "Repeat Customers" selectable criteria 120 that includes return rate percentage 122 and return visits per year 124, and "Merchant Costs" 126 selectable criteria that includes food cost percentage 128. The fields illustrated in FIG. 1 are merely for illustration purposes.

The various fields in FIG. 1 may be fixed or may be changeable via input from the merchant or sales representative. Initial entries in the various fields may be based on a past promotion offered by the merchant, or may be individual preselected by the sales representative. The initial entries may instead be randomly generated or may be generated based on entries that are historically common for similarly situated merchants (e.g., merchants having a similar merchant type, size, service, location etc.). In yet another alternative, the fields may be initially left blank initially, and are only filled in during an actual negotiation between the merchant and the sales representative. As shown in FIG. 1, for example, various fields are in gray, indicating that those fields have been locked by the sales representative and are not changeable by merchant input. In particular, fields 106, 108, 114 are illustrated in gray. By contrast, fields 104, 110, 112, 118, 122, 124, and 128, which are not grayed out, may be changed by the merchant. In this way, merchant input may be used to change various fields to better illustrate the potential effects of offering the promotion. For example, the return rate 122 may initially be populated with a predetermined percentage based on historical analysis of previous promotions. Thereafter, the return rate 122 may be changed via user input. In this way, the RPI control interface 100 may be used iteratively to determine the potential effect of offering the promotion program.

The average check for two 104 identifies the average amount a single party of customers spends at a merchant's business in a single visit. The Groupon Price 106 identifies the amount at which a Groupon customer will purchase the merchant's offer. As one example, Groupon may offer at least a 50% discount of the average retail value to attract new customers to the merchant's business. The (Avg) Groupon Value 108 identifies the promotional amount a customer receives toward the purchase of specified goods or services at the merchant's. For promotions related to experiences, this is the amount a customer typically spends for items included in the experience. The Customers/Groupon 110 identifies the average size of a party for a single visit (e.g., 3 out of 4 merchants report that Groupon customers bring friends when redeeming their Groupon voucher). For experiences, this represents the number of customers who will participate in the experience. The Unit Cap 112 identifies the number of units that Groupon can sell over the duration of a promotion campaign. Based on previous history, it is estimated that approximately 20% of units will be redeemed in each of the first and last months of the campaign, with a continuous stream of redemptions in the intervening months. The Merchant Share 114 identifies the revenue that the merchant may expect to receive from a Groupon. The merchant receives payment shortly after the merchant's offer is purchased, so that the payment can be used to help pay down costs associated with producing the merchant's offer.

The Merchant Share 114, which may otherwise be known as the provider margin, may be manually entered or may be automatically calculated by the ROI system based on one or more of the following values: a historical information margin that compares reviews of the merchant to reviews of similar merchants; a provider profile margin, taking into account a merchant quality score; a promotion structure margin, which takes into account the size of the discount, the Unit Cap 112, historical margins, and margins for similar discounts and units; or a positive ROI margin, which identifies a minimum margin that provides the merchant with a positive ROI. Such values may be used alone or aggregated through a linear combination or other similar aggregation method. Further explanation of such values and associated calculations is provided by U.S. Provisional Patent Application 61/770,174, titled "Method for Determining Provider Parameters Including a Provider Margin," and U.S. patent application Ser. No. 13/832,804, titled "Method for Determining Provider Parameters Including a Provider Margin," which are respectively incorporated by reference in their entireties.

The "Additional Spend" 116 selectable criteria include upsell amount 118, which identifies the amount a customer spends on goods or services that exceeds the value of the Groupon voucher. Based on analysis of previous Groupon voucher redemptions, it is estimated that customers on average spend 55% more than the value of their Groupon voucher.

The "Repeat Customers" 120 selectable criteria includes Return Rate % 122 that identifies the percentage of new customers the merchant typically attracts back to the merchant's business. Based on analysis of repeat customers, the system estimates that the return rate % 122 for customers whose arrival is prompted by purchasing a Groupon is similar to that of other new customers who come in.

The "Merchant Costs" 126 selectable criteria includes Food Cost % 128 that identifies the incremental (variable) cost to produce the value of the Groupon voucher. With Groupon, this cost may be incurred when a customer redeems his or her voucher. Average food and beverage costs may range from 28-35% of the purchase price.

The merchant's revenue ("Your Revenue") 130 includes revenue from "Repeat Customer Revenue" 132, "Additional Spend Revenue" 134 and "Your Groupon Check" 136. As shown in FIG. 1, the ROI system calculates repeat customer revenue 132 using the following formula:

$$\text{Repeat Customer Revenue} = \text{Unit Cap} \times \frac{\text{Customers}}{\text{Groupon}} \times \text{Average Check for 2} \times (\text{Return Rate \%}) \times \frac{\text{Return Visits}}{\text{Year}}$$

In this example, with a unit cap of 100, 2 customers per Groupon, an average check for two of $60, a return rate of 10%, and 2 return visits per year, the repeat customer revenue 132 of this example is 100×2×60×10%×2, or $2,400.

Further, the ROI system calculates additional spend revenue 134 using the following formula:

Additional Spend Revenue=Unit Cap×Average Upsell

In this example, with a unit cap of 100 and an average upsell of $20, the additional spend revenue 134 of this example is 100×20, or $2,000.

Finally, the ROI system calculates Your Groupon Check revenue 136 using the following formula:

Your Groupon Check=Unit Cap×Merchant Share

In this example, with a unit cap of 100 and a merchant share of $10, the Your Groupon Check revenue 136 is 100×10, or $1,000.

Accordingly, the merchant's revenue 148 in this example is $2,400+$2,000+$1,000=$5,400.

The merchant's cost ("Your Cost") 138 includes Repeat Revenue Cost 140, Additional Spend Cost 142, and Check Cost 144. The ROI system calculates the costs by multiplying the corresponding revenue by Food Cost % 128. Accordingly, the repeat revenue cost 140 is the repeat customer revenue 132 multiplied by the Food Cost 128, or $2,400× 35%=$840. The additional spend cost 142 is the additional spend revenue 132 multiplied by the Food Cost 128, or $2,000×35%=$700. Finally, the check cost 144 is the Unit Cap 112 multiplied by the Average Groupon Value 108 multiplied by the Food Cost 128, or 100×$40×35%=$1,400.

Accordingly, the merchant's cost 150 in this example is $840+$700+$1,400=$2,940.

The ROI system calculates the merchant's profit (identified as "Your Profit" 146) as Your Revenue 148 (shown as $5,400) minus Your Cost 150 (shown as $2,940), which equals Your Profit 152 (shown as $2,460).

The number of new customers 156 brought in by the promotion can be calculated by the ROI system as the unit cap 100 multiplied by the number of customers per Groupon, or 100×2=200. The investment per customer 158 is the check cost 144 minus the Your Groupon Check cost 154 divided by the number of new customers 156, or ($1,400−$1,000)÷200=$2.

Finally, the Return On Investment (ROI), which comprises the revenue generated by each dollar spent on marketing using promotions, can be viewed as a ratio of the merchant's revenue 148 to the Your Groupon Check cost 154. With a revenue of $5,400 and total spent of $1,000, the ROI system in this example produces a ROI 160 of $5,400: $1,000, or 5.4:1.

The ROI system may automatically update each of the above calculations and graphical representations as values are entered in the criteria fields and/or when the user selects the "update calculation" 162.

FIG. 2 shows a revenue and profit impact control interface 200 generated by the ROI system for sales representatives. The sales representative may control whether an ROI criteria is selectable (editable) by the merchant from the merchant's view. The sales representative may use the revenue and profit impact control interface 200 to lead a dialogue with the merchant to determine a mutually agreeable ROI for the merchant. The ROI criteria values may be selected (e.g., by the sales representative) and/or automatically selected by the system based on the merchant, merchant type or some other criteria. Reference deal structures may be used to prefill the values to pre-populate the return on investment calculations. For example, the sales representative may select a default set of ROI criteria from a repository of promotion criteria 202. The values entered by the merchant and/or the sales representative are adjusted on the graphical display in real-time. In this regard, functions described herein as real-time need not actually occur without any delay at all, but may occur without perceivable delay, or in other words, in substantially near real-time. In one such embodiment, the graphical representation may be updated using a third party service (e.g., www.pusher.com, which may perform updates with an average delay of 5 milliseconds) that is responsive to values entered by the merchant and/or the sales representative. The system provides a way to build a live graphical representation of a return on investment calculation collaboratively by a merchant and sales representative.

The sales representative view includes user selectable icons (e.g., 204, 206, 208, 210) that may not be viewable or selectable by the merchant. For example, the sales representative view includes "lock" icons (e.g., 204, 206, 208) that can be toggled to lock or unlock a parameter. As another example, the data format of a field may be changed. For example, the "merchant share" may be represented as a percentage of the total revenue or a dollar amount for the "merchant share" data format, by toggling icon 210.

The system provides mouse over 212 views for each of the sub-components of "Your Revenue" 130 (e.g., "repeat customer" 214, "additional spend" 216, "merchant share" 218), "Your Cost" 132, and "Your Profit" 134 calculations that display the calculations used to calculate the amounts in each category (130, 138, 146).

Figure 2A:
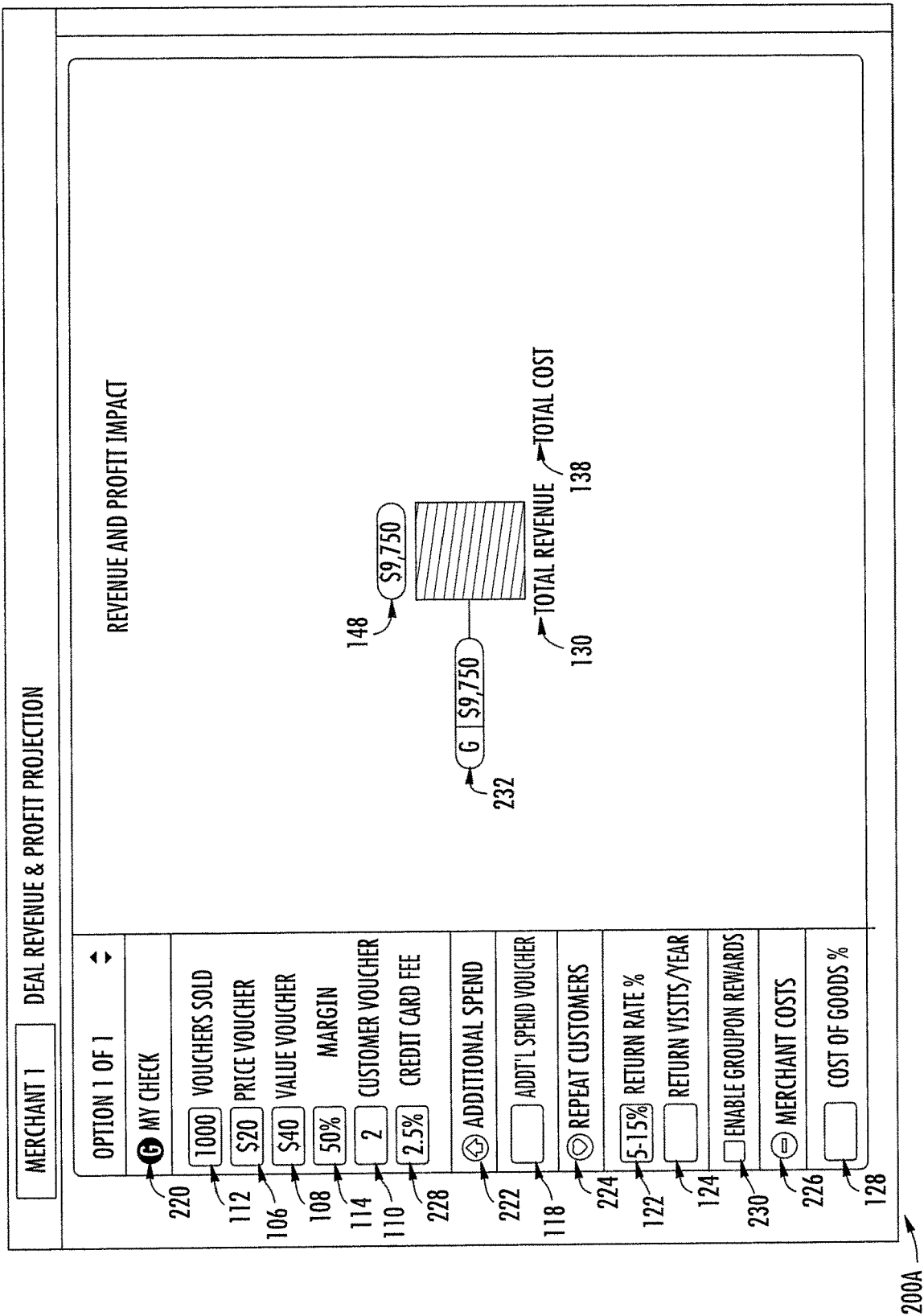
FIG. 2a shows merchant share of revenue calculation.

FIG. 2a shows the merchant share 200A of revenue calculation. The merchant share 200A of a revenue calculation may be calculated by the ROI system using the inputs to the "Your Groupon Check" 102 criteria. In this regard, when MyCheck icon 220 is selected, the Revenue and Profit Impact displays the resulting direct revenue impact 232 of implementing the promotion. The merchant share 200A of revenue calculation also takes into account the unit cap 112 (e.g., number of vouchers sold), the Groupon price 106 (e.g., price per voucher), the average Groupon value 108 (e.g., value per voucher), the merchant share 114 (e.g., margin), and a credit card fee per transaction 228.

Accordingly, the ROI system calculates the direct revenue impact 232 using the following formula:

MyCheck Revenue=Unit Cap×Groupon Price×Merchant Share×(1−Credit Card Fee)

In this example, with a unit cap of 1000, a Groupon Price of $20, a merchant share of 50%, and a Credit Card Fee of 2.5%, the MyCheck revenue 232 is 1000×20×0.5×(1−0.025), or $9,750. Because only the MyCheck icon 220 is selected, the overall merchant revenue 148 is shown based only on the revenue calculation due to the promotion.

Figure 2B:
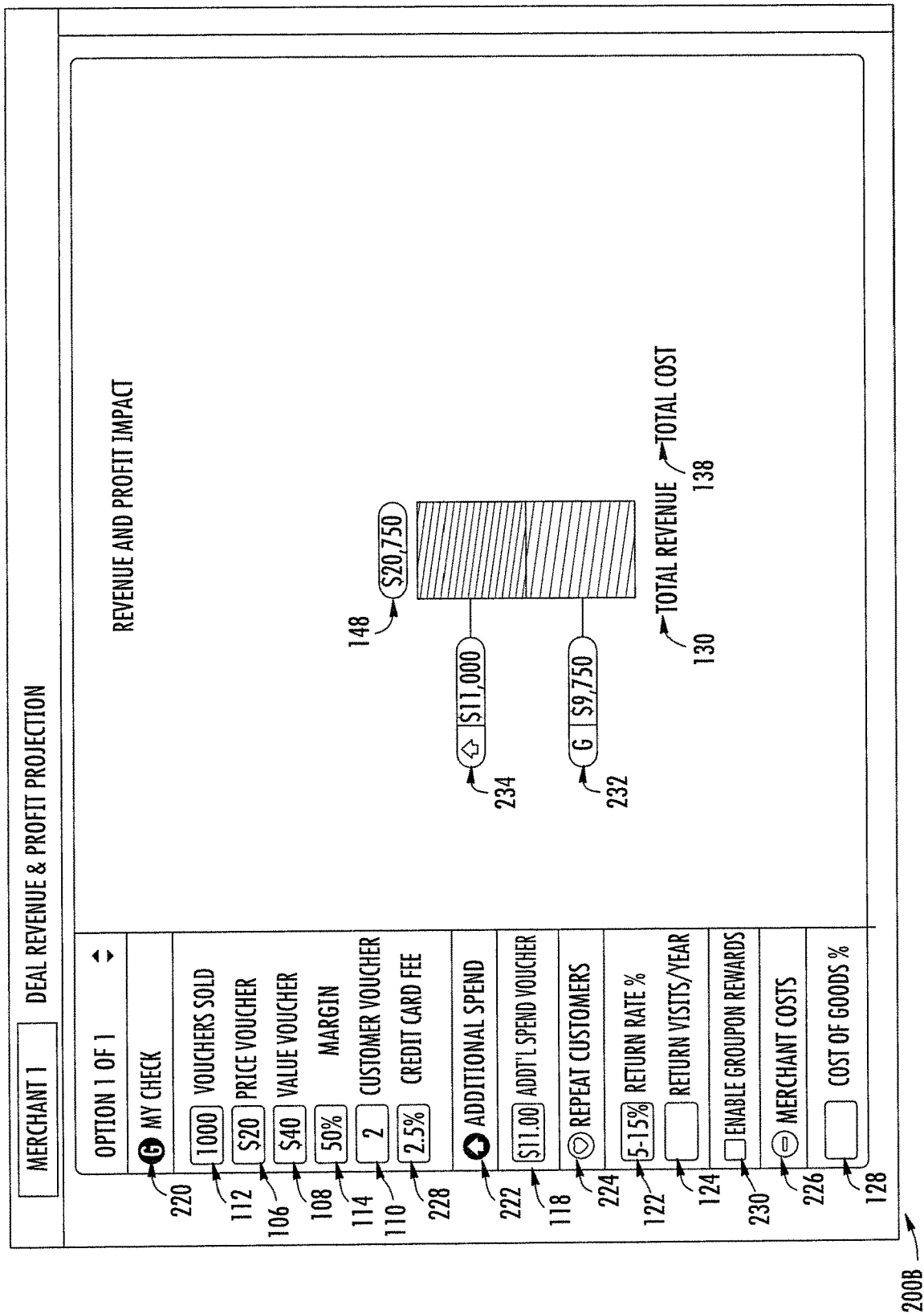
FIG. 2b shows merchant share of revenue and revenue from additional spend calculation.

FIG. 2b shows an interface that additionally factors in the revenue generated from upsells. Because MyCheck icon 220 is selected and Additional Spend icon 222 is also selected, the ROI system calculates the impact of the merchant share 200B of revenue and also the revenue from the additional spend calculation. The merchant share of revenue and revenue from Additional Spend 200B calculation may be calculated by the ROI system using the inputs to the "Your Groupon Check" 102 criteria and "Additional Spend" 116 criteria. The merchant share 200B of revenue calculation also takes into account the additional spend per voucher 118.

The ROI system calculates the additional upsell revenue 234 using the following formula:

Additional Spend Revenue=Unit Cap×Additional Spend Per Voucher

In this example, with a unit cap of 1000 and an additional spend per voucher (118) of $11, the additional upsell revenue 234 is 1000×11, or $11,000. Accordingly, the overall merchant revenue 148 is calculated to be $20,750, based on the MyCheck revenue 232 and the additional upsell revenue 234.

FIG. 2c shows an interfaced that additionally factors in the revenue from repeat customers generated by the promotion. Because MyCheck icon 220, Additional Spend icon 222, and Repeat Customers icon 224 are selected, the merchant share 200C of revenue includes direct revenue from the promotion 232, from additional spend 234, and from repeat customer revenue 236. The merchant share of revenue from additional spend and repeat customer revenue calculation 200C may be calculated by the ROI system using the inputs to the "Your Groupon Check" 102 criteria, "Additional Spend" 116 criteria and "Repeat Customer" 120 criteria. The merchant share 200C of revenue calculation also takes into account the average check for 2 104 (not shown in FIG. 2c), the return rate 122 and the return visits per year 124.

The ROI system calculates the repeat customer revenue 236 using the following formula shown above with respect to repeat customer revenue 132:

$$\text{Repeat Customer Revenue} = \text{Unit Cap} \times \frac{\text{Customers}}{\text{Groupon}} \times \text{Average Check for 2} \times (\text{Return Rate \%}) \times \frac{\text{Return Visits}}{\text{Year}}$$

In this example, with a unit cap of 1000, 2 customers per Groupon, an average check of $35, a return rate of 10%, and 1 return visit per year, the repeat customer revenue 236 is 1000×2×35×0.1×1, or $7,000. Accordingly, the overall merchant revenue 148 is calculated to be $27,750, based on the MyCheck revenue 232, the additional upsell revenue 234, and the repeat customer revenue 236.

In addition, selection of the "Enable Groupon Rewards" icon 230 allows for a calculation of the impact of a rewards system on revenue.

Figure 2D:
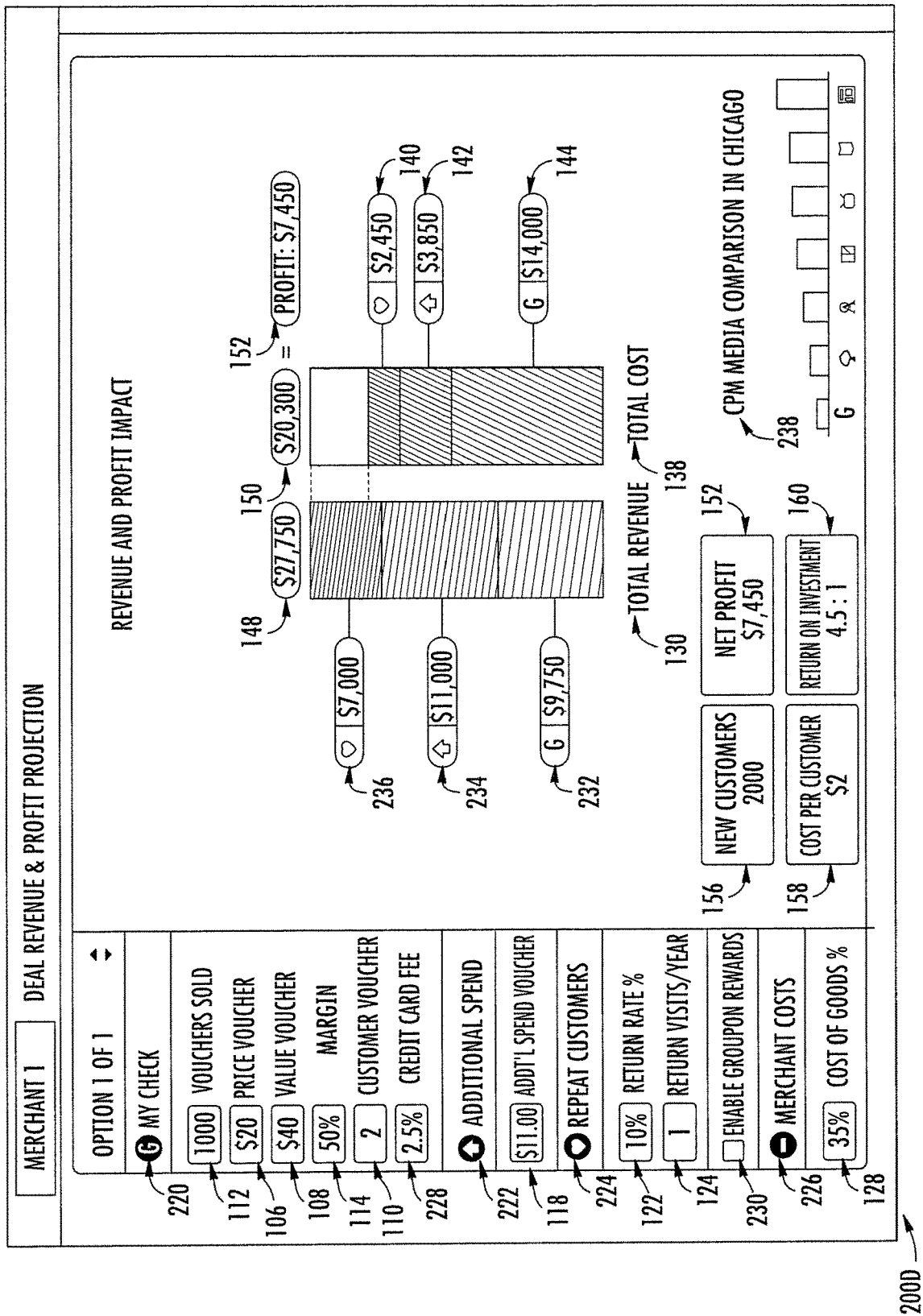
FIG. 2d shows revenue and costs according to the merchant share, additional spend and repeat customer activity.

FIG. 2d shows revenue and costs 200D according to the merchant share, additional spend and repeat customer criteria, as calculated by the ROI system. Because MyCheck icon 220, Additional Spend icon 222, and Repeat Customers icon 224 are selected, the revenue and costs 200D includes direct revenue from the promotion 232, from additional spend 234, and from repeat customer revenue 236. Because Merchant Costs icon 226 is also selected, the ROI system can further calculate the merchant costs 150 and profit 152. The merchant costs (140, 142, and 144) are calculated in the manner described above, and in this example amount to $20,300. Accordingly, the profit 152 comprises $7,450.

FIG. 2d additionally shows the number of new customers 156, the net profit 152, the investment per customer (cost per customer) 158, and the return on investment 160, calculated as described previously. In addition, FIG. 2d displays to the user a comparison of advertising costs 238 of using the promotion versus using other traditional forms of advertising.

Figure 3:
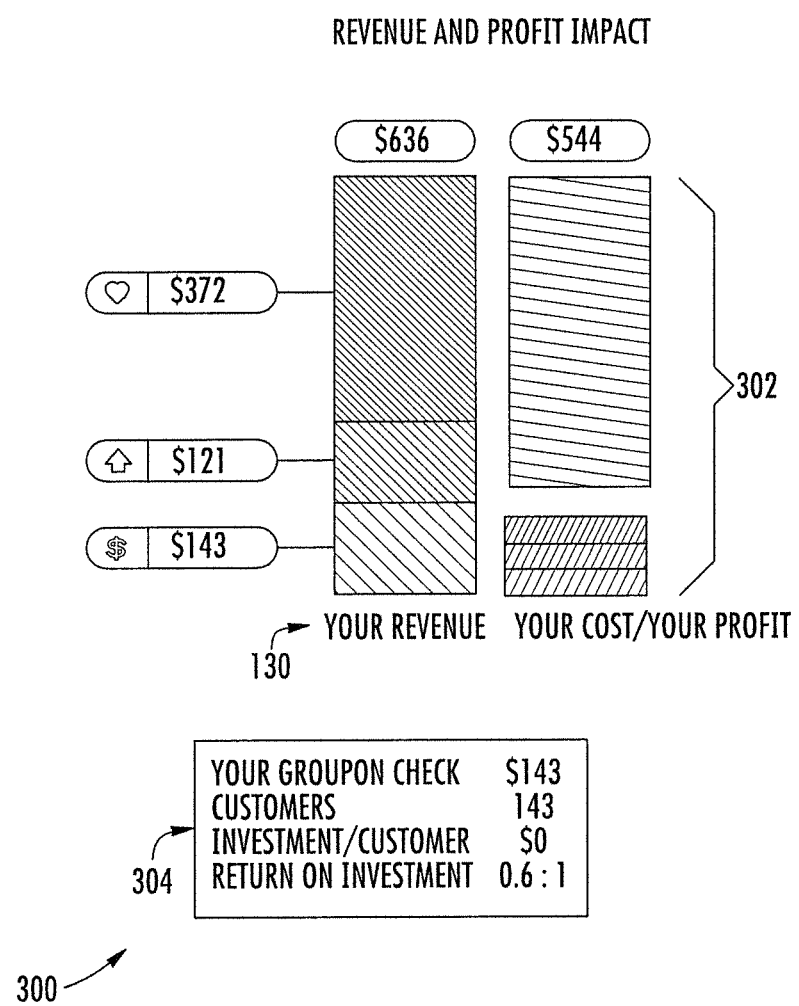
FIG. 3 shows a display interface for a mobile device.

FIG. 3 shows a mobile device display interface 300. The system may communicate the ROI interface in a way to accommodate the display of the mobile device. The sales representative may communicate the ROI calculator to a mobile device of a merchant and the ROI calculator adapts to the viewing area of the mobile device being used to view the ROI calculator. For example, the graph may be displayed in the center area of the display (e.g., using two columns instead of three columns). Depending on the capability of the mobile device display interface, the ROI system may collapse the "your cost" and "your profit" columns (see item 302), and may arrange information (e.g., 154, 156, 158, 160) so that the information is easily viewable (see item 304).

Figure 3A:
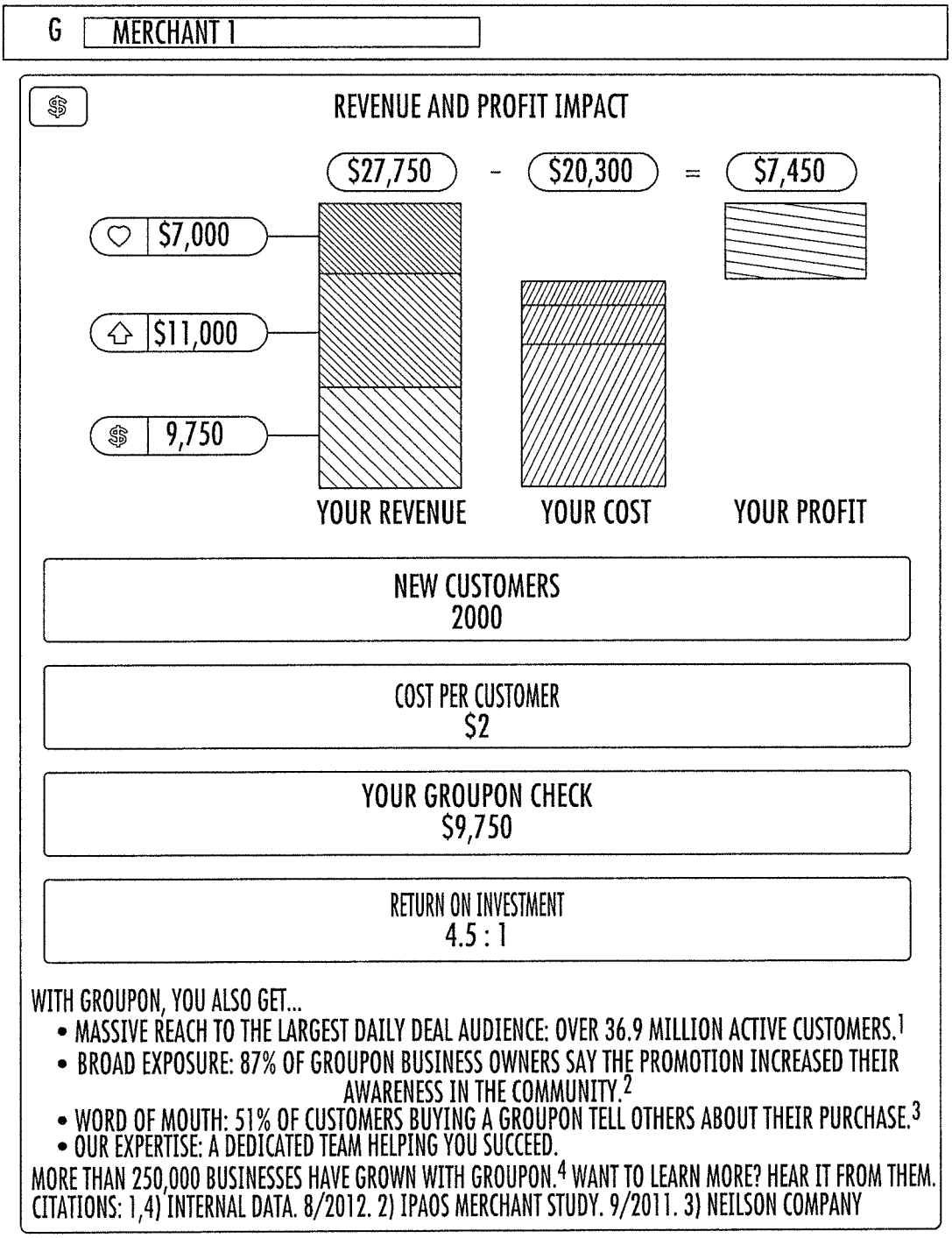
FIG. 3a shows another display interface for a mobile device.

FIG. 3a shows another display interface 300a for a mobile device such as a tablet computing device.

Figure 3B:
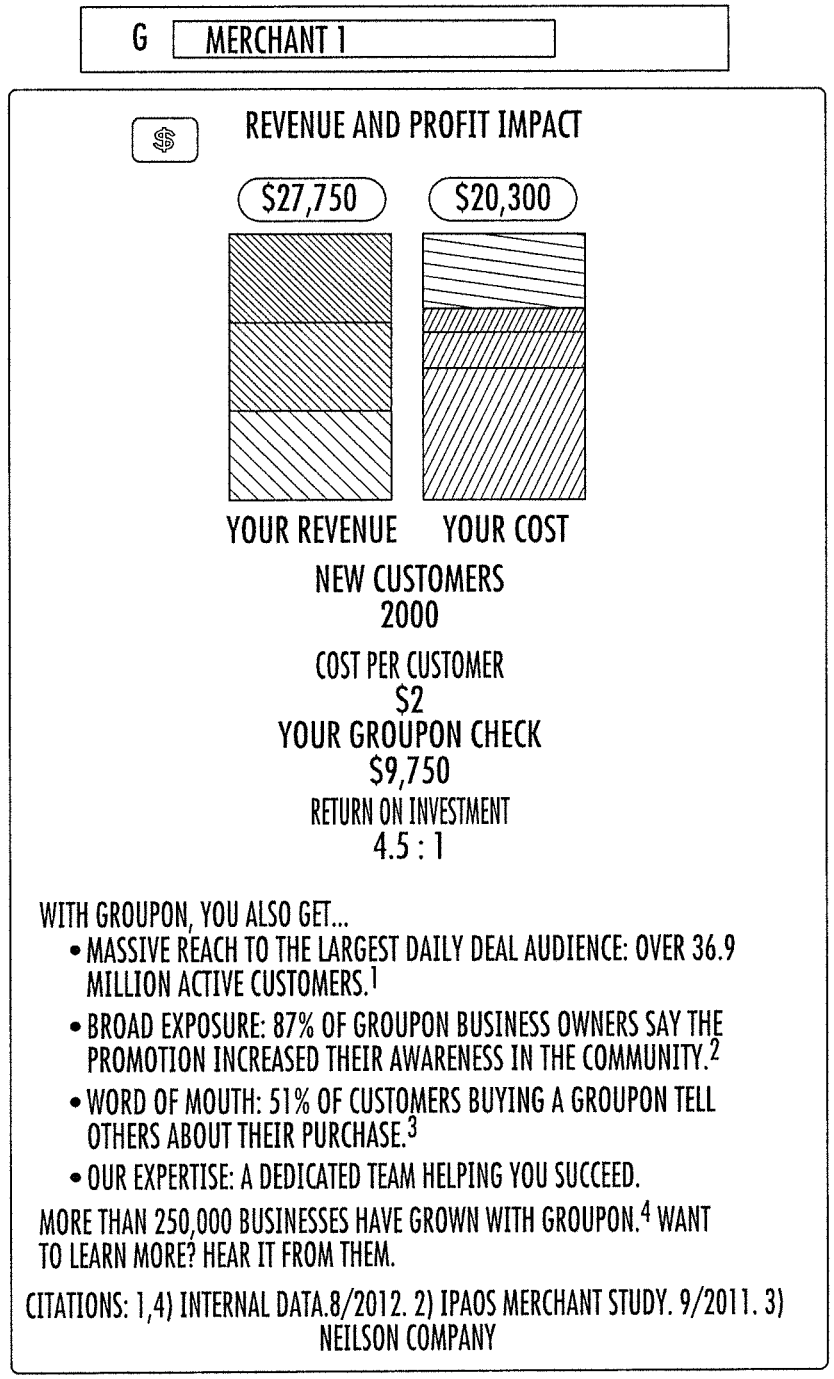
FIG. 3b shows one other display interface for a mobile device.

FIG. 3b shows one other display interface 300b for a mobile device such as a smart phone.

In some embodiments, the above-described features may be used to provide merchants with a rich source of relevant information about existing promotions. In this regard, the ROI system may populate and present to merchants a Merchant Impact Report, which enables the merchant to evaluate the performance of an existing promotion based on the previously described calculations, as well as additional data collected by the ROI system.

Figure 3C:
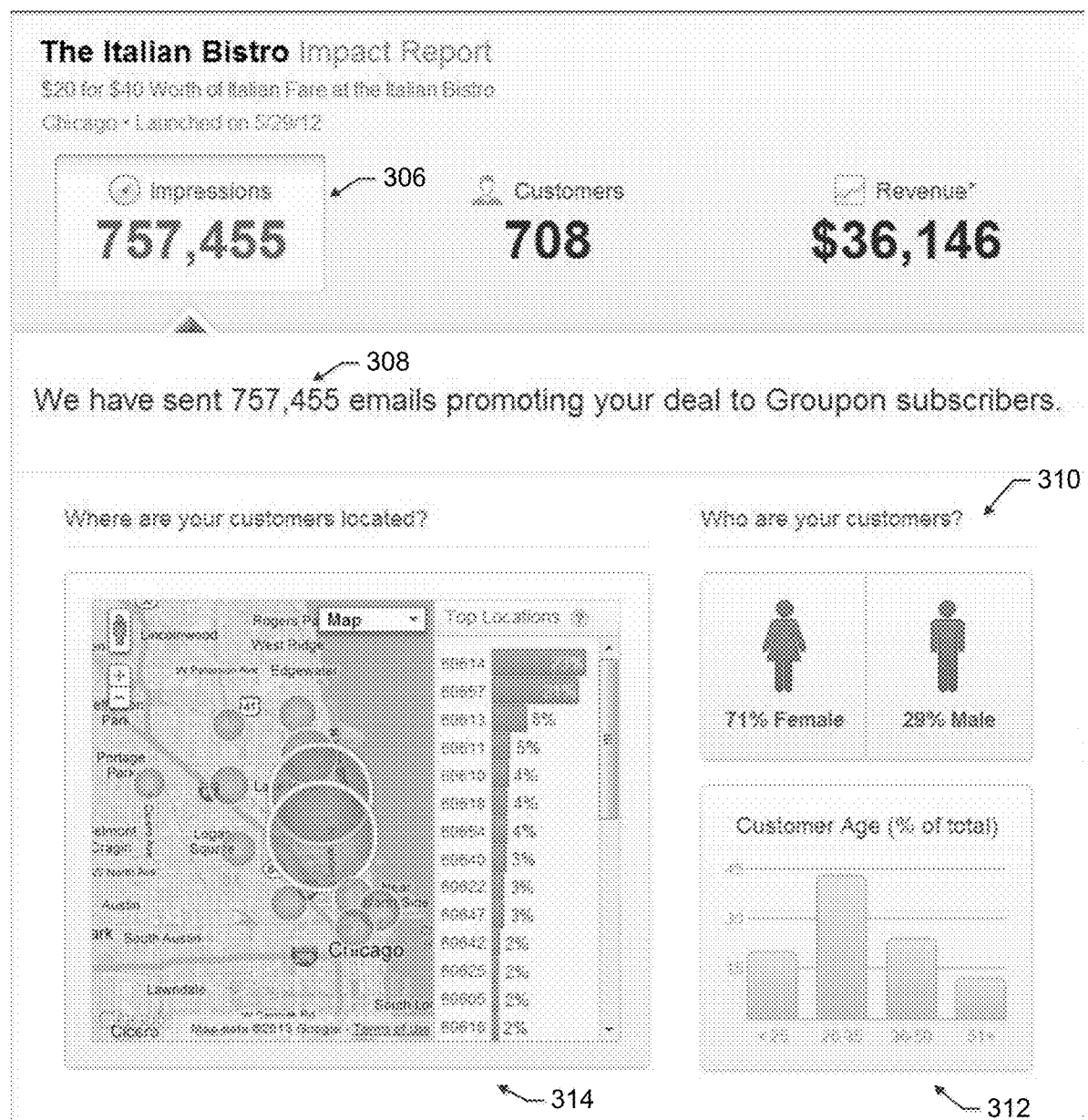
FIG. 3c illustrates an example graphical user interface for a merchant, showing demographic information relating to a promotion.

FIG. 3c shows an impressions interface 306 generated by the ROI system that may be presented to a merchant in connection with a selected promotion. The impressions interface 306 displays the number of impressions 308 of the promotion that are sent to promotion and marketing service subscribers. In this example, the impressions are sent to subscribers via email, although other delivery mechanisms (such as those described previously) are contemplated. For instance, the impressions may be distributed using a mobile device application or website.

Some fraction of subscribers receiving impressions may subsequently purchase the promotion. Because promotions are purchased from the promotion and marketing service, the promotion and marketing service is able to compile demographic information regarding the subscribers who have purchased the promotion and present such demographic information to the ROI system as attributes of the promotion. Thereafter, the ROI system can calculate, based on the attributes of the promotion, the gender, age, and zip code of the subscribers who have purchased the promotion.

Using the impressions interface 306, the ROI system is able to display to the merchant a gender representation 310 of the gender of the customers who have purchased the promotion. For instance, the gender representation 310 may include a percentage of customers who have purchased the promotion that are male and a percentage of the customers who have purchased the promotion that are female.

Similarly, the impressions interface 306 may display to the merchant an age representation 312. The age representation 312 may include the ages of customers who have purchased the promotion. In one embodiment, the age representation 312 may include a histogram showing a number of customers who have purchased the promotion in one or more age ranges.

Using the impressions interface 306, the ROI system is able to display to the merchant a representation 314 of the zip codes of the customers who have purchased the promotion. This representation may include a histogram showing a number of customers who have purchased the promotion for each zip code. The representation 314 may also include a map showing the zip codes of the customers who have purchased the promotion. In one embodiment, the map is a cluster map, which places a circle over each zip code of a customer who has purchased the promotion, and varies the size of the circle based on the number of customers in the zip code.

Although impressions interface 306 may display demographic information regarding subscribers who have purchased the promotion, the impressions interface 306 may additionally or alternatively display demographic information regarding subscribers to whom impressions have been delivered (i.e., subscribers who have been sent an email advertising the promotion).

Figure 3D:
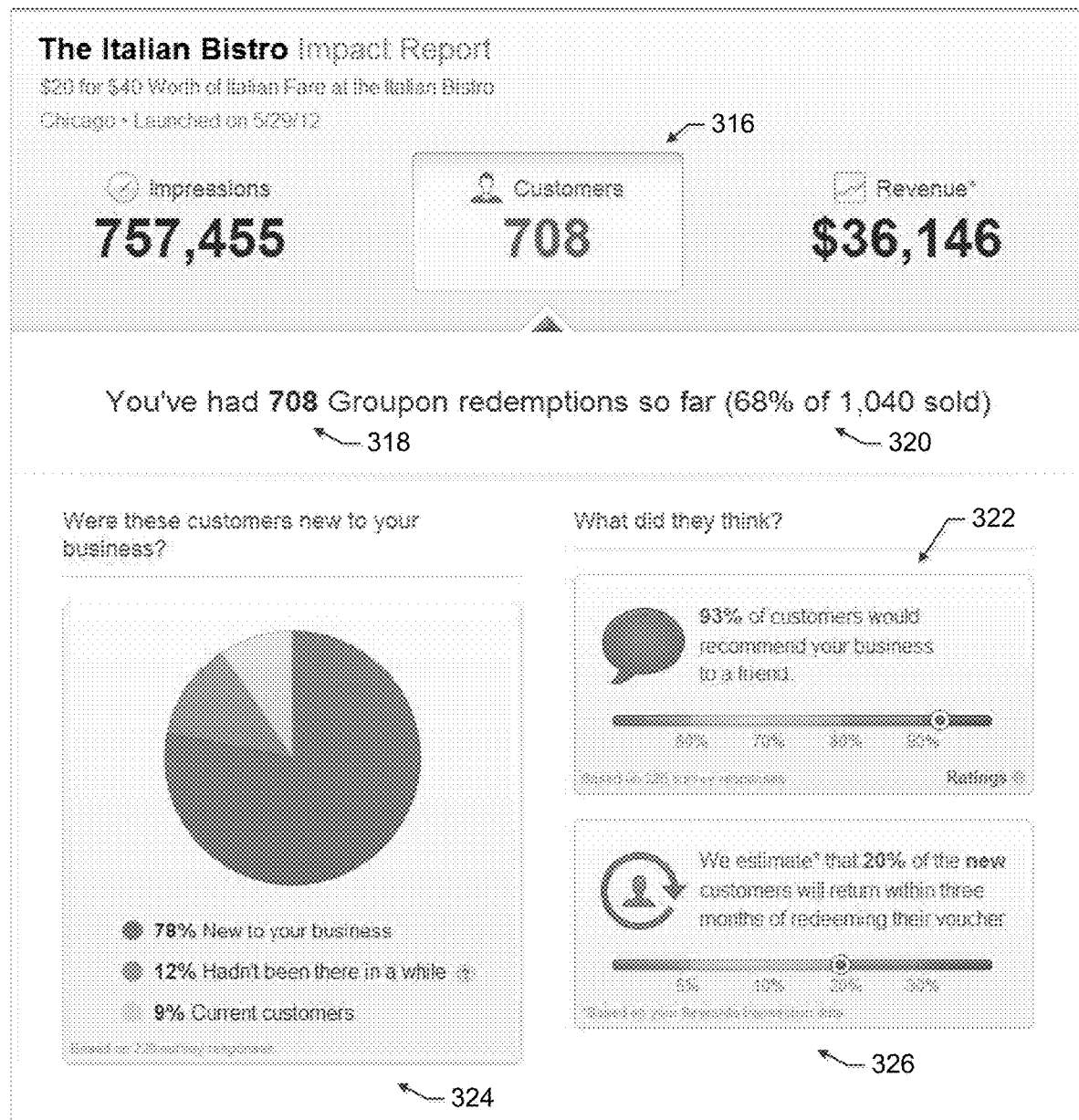
FIG. 3d illustrates an example graphical user interface for a merchant, showing customer survey information relating to a promotion.

FIG. 3d shows a customers interface 316, generated by the ROI system, that may be presented to a merchant in connection with a selected promotion. The interface 316 displays the number of customers who have redeemed the promotion 318. In addition, the customers interface 306 may disclose the percentage of purchased promotions that have been redeemed 320. Moreover, the promotion and marketing service may request that the customers who have redeemed the promotion 318 complete surveys about their experience with the merchant. Based on the survey results, the customers interface 316 may display additional information to the merchant.

For instance, based on the survey results, the ROI system may calculate an average rating of the merchant. The customers interface 316 may then display the average merchant rating 322 (using, for instance, a number line or other similar graphical format). In one embodiment, the customers interface 316 may additionally display a percentage of customers who would recommend the merchant's business to a friend.

Similarly, based on the survey results, the ROI system may determine the number of customers who were new to the merchant at the time of redeeming the promotion and the number of customers that had not visited the merchant for a predetermined amount of time (such as three months) prior to redeeming the promotion. Accordingly, in one embodiment, the customers interface 316 may additionally display a chart 324 indicating a percentage of customers who were new to the merchant at the time of redeeming the promotion, a percentage of customers that had not visited the merchant for a predetermined amount of time prior to redeeming the promotion, and a remaining percentage of customers.

In one embodiment, the ROI system may calculate, based on customer rewards information, an estimated percentage of new customers that will return to the merchant within a predetermined amount of time of redeeming a voucher. In one embodiment, this information may be based on the historical return rate of existing customers, tracked using customer rewards information. In another embodiment, it may be based on the number of customers that would receive an additional promotion for returning. In yet another embodiment, the estimated percentage of new customers that will return is based on an evaluation of the past behavior of the new customers, as shown by the customer rewards information. Accordingly, in this embodiment, the customers interface 316 may additionally display the estimated percentage of new customers that will return to the merchant within the predetermined amount of time of redeeming a voucher 326 (using, for instance, a number line or other similar graphical format).

Figure 3E:
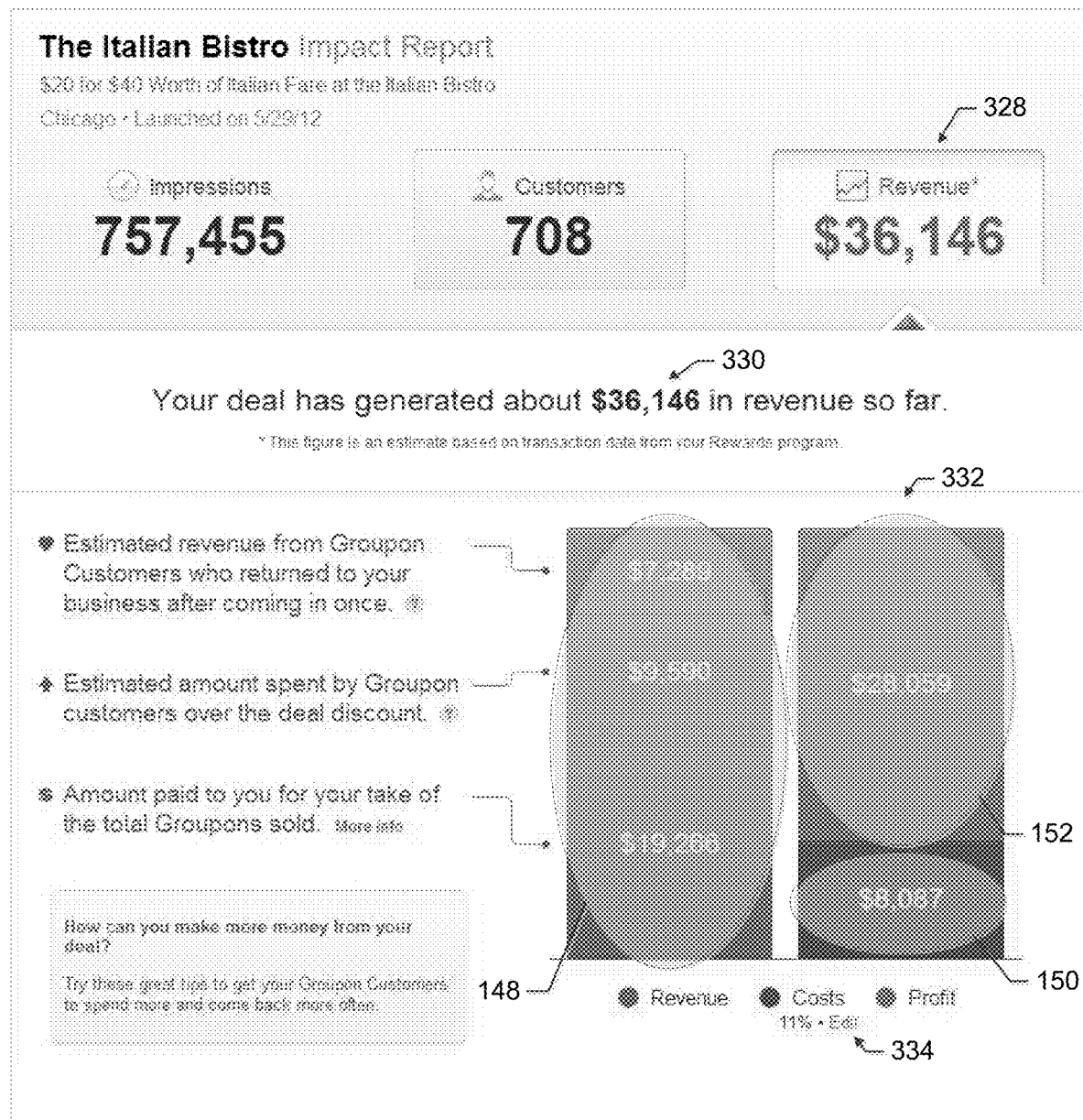
FIG. 3e illustrates an example graphical user interface for a merchant, showing revenue, cost, and profit information regarding a promotion.

FIG. 3e shows a revenue interface 328, generated by the ROI system, which may be presented to a merchant in connection with a selected promotion. The revenue interface 328 displays the financial impact of the promotion. For instance, it may display the revenue 330 generated by the promotion so far. Revenue 330 may comprise the merchant's revenue 148 as discussed previously. In addition, the customers interface 306 may display a breakdown of the merchant's financial information 332. This information includes the merchant's revenue 148, merchant's cost 150, and merchant's profit 152, calculated by the ROI system as previously described. In one embodiment, this financial information 332 may be displayed as a histogram.

In another embodiment, the merchant's financial information 332 may be configurable when the merchant uses an input device to select the cost editor 334. The merchant may edits its cost (e.g., projected, estimated, or actual) using the cost editor 334. For example, in the depicted embodiment, the merchant may edit its cost from 11% (as shown) to 13% upon receiving notice that its cost of materials for certain raw materials have risen.

Figure 3F:
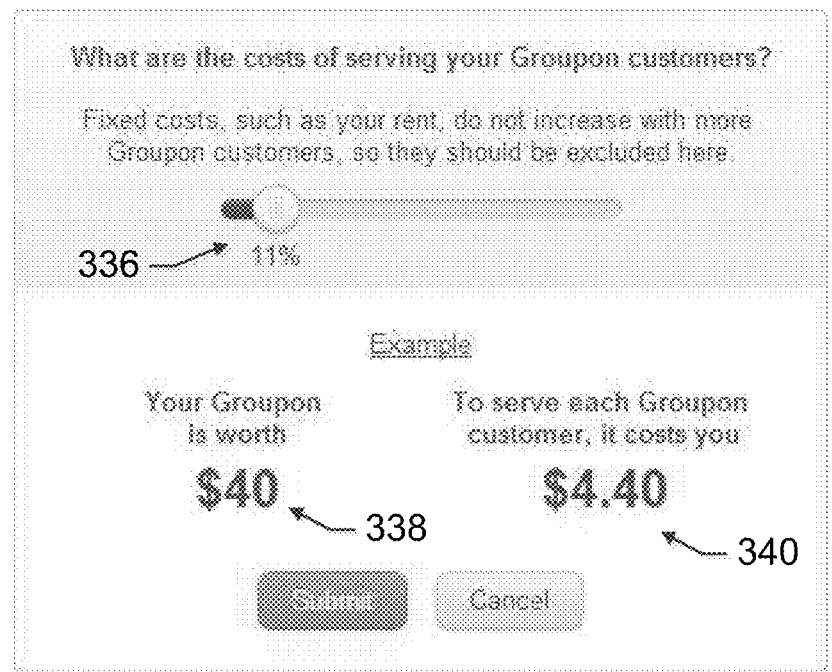
FIG. 3f illustrates an example graphical user interface that a merchant may use to update the marginal cost of a promotion.

FIG. 3f shows one example cost editor interface displayed by the ROI system upon merchant selection of the cost editor 334. The cost editor interface enables the merchant to select the percentage of the cost of each promotion that goes towards marginal costs of fulfilling the promotion. In one such embodiment, food cost 128, discussed previously, corresponds to the marginal cost selected using cost editor 334. In other embodiments, food cost 128 may only be one of many factors that go into a merchant's calculation of the marginal cost of fulfilling a promotion. In yet other embodiments (e.g., non-food serving embodiments such as spas, etc.), food cost 128 may not be relevant to the marginal cost of fulfilling the promotion.

In the depicted embodiment, the merchant may interact with the cost editor interface by manipulating slider 336 until the appropriate percentage is displayed. Because the marginal cost of fulfilling a promotion is highly dependent upon the merchant and the promotion offered, slider 336 enables a merchant to calculate these costs in any manner, and need not force the merchant to use a preconfigured formula. For any given percentage selected using slider 336, the cost editor interface may display the value of the promotion 338 and, based on the percentage selected using slider 336, the interface may display the marginal cost of fulfilling each promotion 340. Based on the value selected using slider 336, the merchant will be returned to the revenue interface 328, which will present an updated breakdown of the merchant's financial information 332, as recalculated by the ROI system in view of the changed marginal cost. For example, in connection with FIG. 3e, the ROI system may provide updated calculations for merchant cost 150 and merchant profit 152 based on the newly edited cost information (e.g., 13%).

Using these additional Merchant Impact Report interface tools, the ROI system enables merchants to develop a much more sophisticated understanding of the value provided by their promotions.

System Architecture

Figure 4:
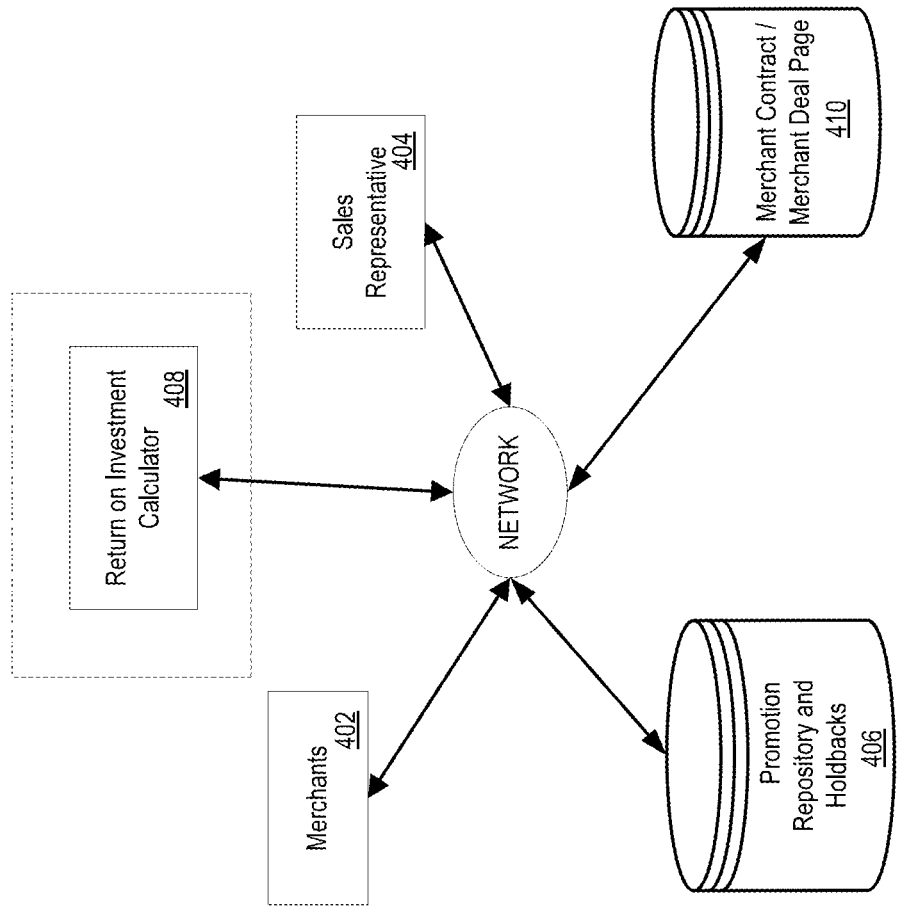
FIG. 4 shows a configuration of the ROI system.

FIG. 4 shows a configuration 400 of the ROI system. The merchant 402 and sales representative 404 may calculate multiple ROI configurations and store the ROI configurations for use (retrieval) in a promotion repository 406 to build other promotions and/or use for comparison for configuring subsequent promotions. From the ROI sales representative view, the sales representative may select, from previously calculated promotions, a default promotion for a merchant in order to initiate a dialogue with the merchant. When the merchant and sales representative agree to the parameters of the transaction (such as one or more fields in the "Your Groupon Check" section of FIG. 1), the ROI system may communicate, to another system, contract parameters (410) prefilled using the ROI calculator calculation. The ROI system may also generate the merchant deal page(s) (410) corresponding to the merchant's promotion that is viewable by the public in order to purchase the merchant's promotion. For example, potential customers may purchase the transaction via a website. In response to agreeing on the parameters of the transaction, the ROI system may generate a webpage for use on the website that reflects the agreed parameters of the transaction. Further, the merchant and/or sales representative may review the webpage and make changes. Similar to the determination of the parameters for the transaction, the merchant (via the merchant computing device) and the sales representative (via the website representative computing device) may both make changes to the webpage.

Return On Investment System Operations

Figure 5:
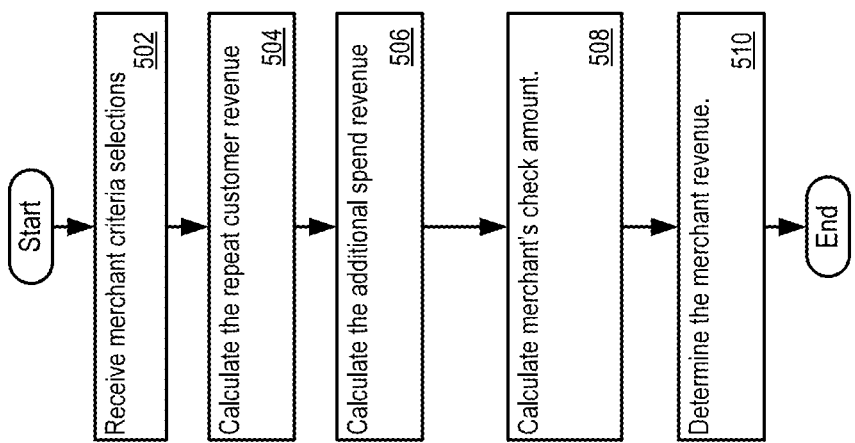
FIG. 5 shows a diagram of logic of how the merchant revenue is calculated.
Figure 6:
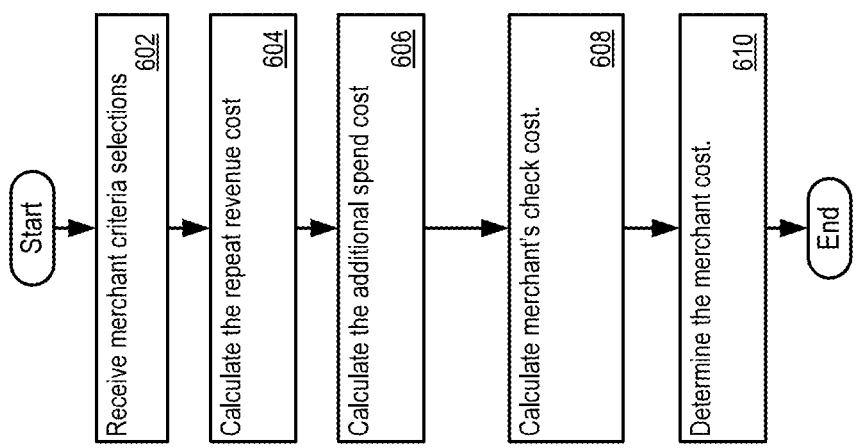
FIG. 6 shows a flow diagram of logic of how the merchant cost is calculated.
Figure 7:
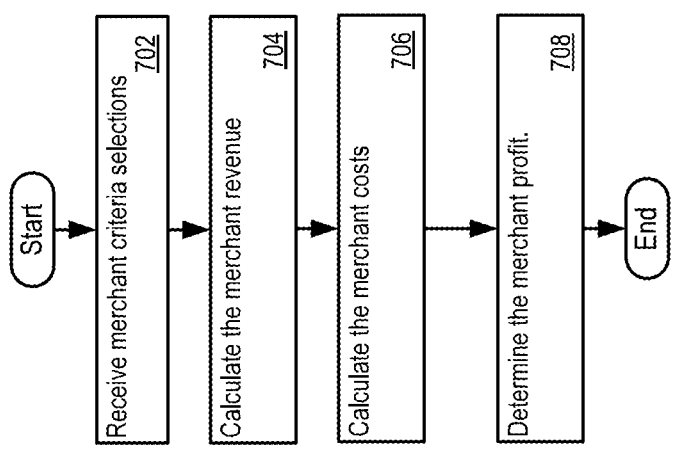
FIG. 7 shows a flow diagram of logic of how the merchant profit is calculated.

FIGS. 5-7 show example operations for generating merchant revenue, cost, profit, and ROI information. The ROI information depends upon revenue, cost, and profit related to a promotion, values which themselves may vary based on the several attributes assigned to the promotion and on projections forecasting expected customer engagement as a result of the promotion, as will be described below.

FIG. 5 shows a diagram of logic 500 of how merchant revenue is calculated. In step 502, the system receives merchant criteria selections. These selections may be received from the merchant or from a sales representative of the promotion and marketing service who interacts with the merchant. These selections comprise inputs indicative of one or more attributes of the promotion, an upsell amount, and one or more indicators of repeat business in response to the promotion. The attributes may include the average check amount for two individuals, the voucher price, the average voucher value, the number of customers per voucher, a unit cap, a merchant share, a food cost percentage, a number of impressions, and demographic information about the customers. The indicators of repeat business may include return rate percentage and return visits per year. Using the received attributes, upsell amount, and indicators of repeat business, the merchant's revenue (shown as "Your Revenue" 130 in FIG. 1) is calculated based on revenue from "repeat customer revenue" 132, "additional spend revenue" 134 and "Your Groupon Check" 136 amount calculated based on the received criteria (e.g., merchant selected criteria).

In operation 504, the ROI system calculates, based on one or more of the attributes received in operation 502, a first amount indicative of revenue generated from the promotion. In one embodiment, the repeat customer revenue is calculated using the following formula (as previously described):

$$\text{Repeat Customer Revenue} = \text{Unit Cap} \times \frac{\text{Customers}}{\text{Groupon}} \times$$
$$\text{Average Check for } 2 \times (\text{Return Rate \%}) \times \frac{\text{Return Visits}}{\text{Year}}$$

In operation 506, the ROI system calculates, based on the upsell amount received in operation 502, a second amount indicative of revenue generated from promotion upsells. This second amount may comprise revenue generated from upsells attendant to administering the promotion. In one embodiment, this second amount is calculated using the following formula (as previously described):

Additional Spend Revenue=Unit Cap×Average Upsell

In operation 508, the ROI system calculates, based on the one or more indicators of repeat business received in operation 502, a third amount indicative of revenue generated from repeat business attendant to administering the promotion. In one embodiment, the merchant's check revenue 136 is calculated using the following formula (as previously described):

Your Groupon Check=Unit Cap×Merchant Share

In operation 510, the merchant's revenue is determined from the first, second, and third amounts.

Subsequently, the ROI system calculates, based on the one or more attributes of the promotion, a fourth amount indicative of costs from the promotion. In this regard, FIG. 6 shows a flow diagram of logic 600 of how this cost is calculated. In operation 602, the ROI system receives the merchant criteria selections. The merchant's total cost includes the repeat revenue cost, the additional spend cost, and the merchant's check cost. The costs may be calculated by multiplying the corresponding revenue by the received food cost, as described previously. Accordingly, in operation 604, the ROI system calculates the repeat revenue cost. In one embodiment, this calculation comprises multiplying the repeat customer revenue 132 by the Food Cost 128. In operation 606, the ROI system calculates the additional spend cost. In one such embodiment, this calculation comprises multiplying the additional spend revenue 132 by the Food Cost 128. In operation 608, the ROI system calculates the merchant's check cost 144, which in one embodiment comprises multiplying the Your Groupon Check revenue 136 by the Average Groupon Value 108 and the Food Cost 128. Accordingly, in operation 610, the ROI system determines the merchant's total cost by adding together the repeat revenue cost, the additional spend cost, and the merchant's check cost.

FIG. 7 shows a flow diagram 700 describing an example mechanism by which merchant profit is calculated. In operation 702, the ROI system receives the merchant criteria selections. In operation 705, the ROI system calculates the merchant revenue. In one embodiment, the merchant revenue is calculated as shown above in operation 510. Subsequently, in operation 706, the ROI system calculates the merchant cost. In one embodiment, the merchant cost is calculated as shown above in operation 610. Finally, in operation 708, the ROI system determines the merchant profit. In this regard, the merchant's profit comprises the merchant revenue minus the merchant cost.

In some embodiments, the ROI system subsequently generates (or updates) a graphical representation displaying the first, second, third, and fourth amounts. In one such embodiment, the graphical representation comprises a first histogram representative of the first, second, and third amounts, and a second histogram representative of the fourth amount. Examples of such graphical representations may be found in FIGS. 1-3b. The graphical representation may provide a forecast using a predictive wizard (i.e., software that automatically calculates outcomes based on various inputs), analytics/demographics (e.g., historical information), similar promotions, or any combination thereof. In some cases, this forecast may include expected profit, an expected number of new customers, an indication of the investment spent per new customer, or an indication of a ratio showing an expected return on investment (shown, for example, in FIG. 1, elements 152, 156, 158, and 160, respectively).

In some embodiments, the graphical representation may be a graphical user interface (GUI) with which the merchant and sales representative may provide the inputs used in the above-described calculations and forecasts. In such embodiments, the ROI system may receive input from the sales representative to lock or unlock certain fields in the interface and may allow off-line merchant manipulation of the graphical representation. Accordingly, the unified payment and ROI system may generate a real-time ROI as output for one or more promotions.

Payment System Operations

In addition to providing a ROI system that generates a real-time ROI as output for one or more promotions, in some embodiments the unified payment and ROI system additionally determines a payment structure for distributing revenue received from the sale of promotions to customers. The system supports a perpetual contractual arrangement with many feature periods. In this regard, a feature period may comprise a time period during which a promotion is active (and after which vouchers for the promotion expire). Accordingly, multiple feature periods may be used for each promotion. Payment is based on inventory sold during each feature period, rather than merchandising. The system further supports a limited contract. The system may regularly pay a merchant what is due the merchant in total using a payment schedule, rather than sending lots of payments on a seemingly random schedule.

As part of the this process, when vouchers for a promotion are sold in a particular period of time, the promotion and marketing service may hold back a certain configurable percentage of the revenue received from selling the vouchers (such as 20%), so that there's a buffer in the bank. This buffer can be used to protect the promotion and marketing service from the monetary risk exposure when customers may seek to request a refund of their voucher purchase. Although a single refund request may easily be handled by a promotion and marketing service, hundreds or thousands of refund requests may be difficult to fulfill without having large amounts of money in reserve. Moreover, there is no guarantee that merchants will refund their portion of the revenue to the promotion and marketing service. Accordingly, without a holdback amount, the promotion and marketing service would have significant monetary risk exposure. Accordingly, the unified payment and ROI system maintains a holdback amount that is only distributed to merchants after the relevant refund exposure has ended. In this regard, when vouchers expire, any remaining revenue from the sale of the vouchers can be distributed to the merchant. The holdback amount may depend on whether the level in the buffer is static or dynamic, and the level may be based on the status of the underlying vouchers related to the buffer (i.e., whether they have expired).

This payment mechanism is flexible, simple, and easy to explain to merchants, applicable to various products, and accounts for risk (refund, out-of-business, bad merchants, fraud). The payment mechanism is as attractive to merchants as the current payment grid, takes advantage of automation (transparent Merchant Center), provides a backwards compatible architecture, accommodates promotions with no predetermined ending, is cash flow neutral (e.g., if possible, but merchant benefits may outweigh), and provides the ability to pay for multiple promotions in a single transaction.

The payment mechanism may make initial calculation assumptions. For instance, initial payments may be disbursed to merchants a predetermined time (e.g., seven days) after the start of a feature period; payment for subsequently purchased vouchers may be forwarded on a recurring basis (e.g., the 1st and 16th of each month); and additionally, holdback payments for expired vouchers may be paid in the first recurring payment date after expiration of the vouchers (when these assumptions are not true, the average days until complete payment may be higher). Accordingly, with vouchers expiring after 180 days, 80% of the merchant share of the voucher revenue will be received by the merchant with only nominal delay, and 20% of the merchant share will be received by the merchant upon expiration of the vouchers (i.e., after 180 days), which results in complete payment for each voucher in an average of 36 days; with vouchers expiring after 90 days, there will be complete payment for each voucher in an average of 18 days. Accordingly, the payment mechanism provides business benefits, including: better merchant experience, the removal of volume caps on a deal meter, the ability to have a perpetual contract (with multiple feature periods), inventory-based payment rather than merchandising (feature periods), applicability to new products, and greater consistency of payments to merchants (rather than sending lots of payments on a seemingly random schedule).

Figure 7A:
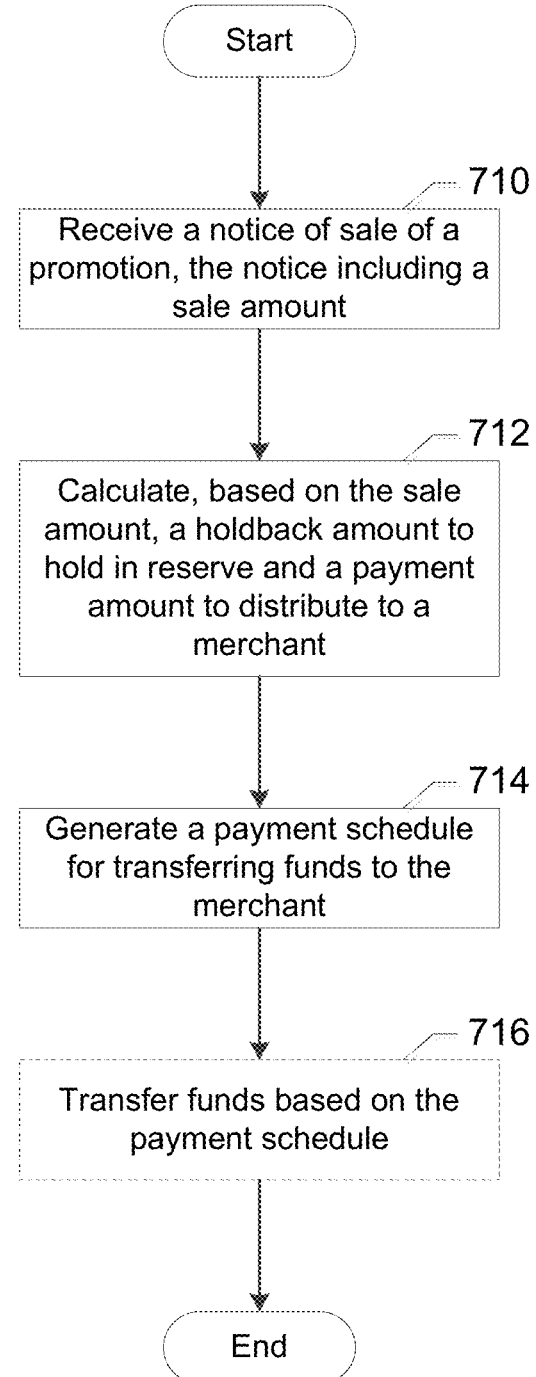
FIG. 7a shows a flow diagram of example operations used by the payment system to schedule and distribute funds to a merchant.

In accordance with the above-described payment system, FIG. 7A illustrates operations describing an example mechanism by which the unified payment and ROI system distributes, to a merchant, revenue from sales of a promotion. In operation 710, the payment system receives a notice of sale of a promotion, the notice including a sale amount. In some embodiments, this notice includes a total number of vouchers sold, and/or the total revenue received from sales of the vouchers. In operation 712, the payment system calculates, based on the sale amount, a holdback amount to hold in reserve, and a payment amount to distribute to a merchant. The holdback calculation is updated and documented to reflect inclusion of any new terms and the calculation reflects the scope of deployment of the new terms. In this regard, the holdback amount and the payment amount are based on one or more of a configurable percentage of the sale amount, an expiration date of the promotion, a number of unredeemed vouchers, a length of a redemption period, a velocity of redemptions, a velocity of refunds, industry trends, a category of promotion, and previous performance of the merchant.

In operation 714, the payment system generates a payment schedule for transferring funds to the merchant. For each voucher, the payment schedule may indicate a date on which to transfer the payment amount and a date on which to process the holdback amount. The date on which to process the holdback amount may be based on the expiration date of the promotion. In one embodiment, an initial payment may be scheduled for a configurable number of days following the start of the feature period. Thereafter, payments may be forwarded on a recurring basis (e.g., the 1st and 16th of each month).

In some embodiments, after the voucher's promotional value expires, the holdback amount (e.g., the remaining twenty percent) may be processed and any remaining balance is included with the next recurring payment. In this regard, processing the holdback amount includes determining an amount of money returned to consumers to fulfill refund requests, and, subtracting this refund amount from the holdback amount to calculate a remaining balance due to the merchant.

For example, each scheduled payment amount may consist of eighty percent (80%) of the total amount due to the merchant from the previous feature period. The merchant is informed that, for example, seven days after the merchant's campaign feature period begins, the merchant may expect to receive a first payment for 80% of sales. Then, twice a month, the merchant will receive a payment for 80% of any additional sales for the period plus any remaining balance (20% for each period, less any other refunds) due as a result of the expiration of vouchers within that period.

In one embodiment, in operation 716 the payment system may initiate a transfer of funds according to the payment schedule (note: the dashed lines indicate that this operation is optional). In this regard, the system may initiate a transfer of the payment amount to the merchant based on the payment schedule. Similarly, the payment system may initiate a transfer of the remaining balance to the merchant based on the payment schedule.

System Components

Figure 8:
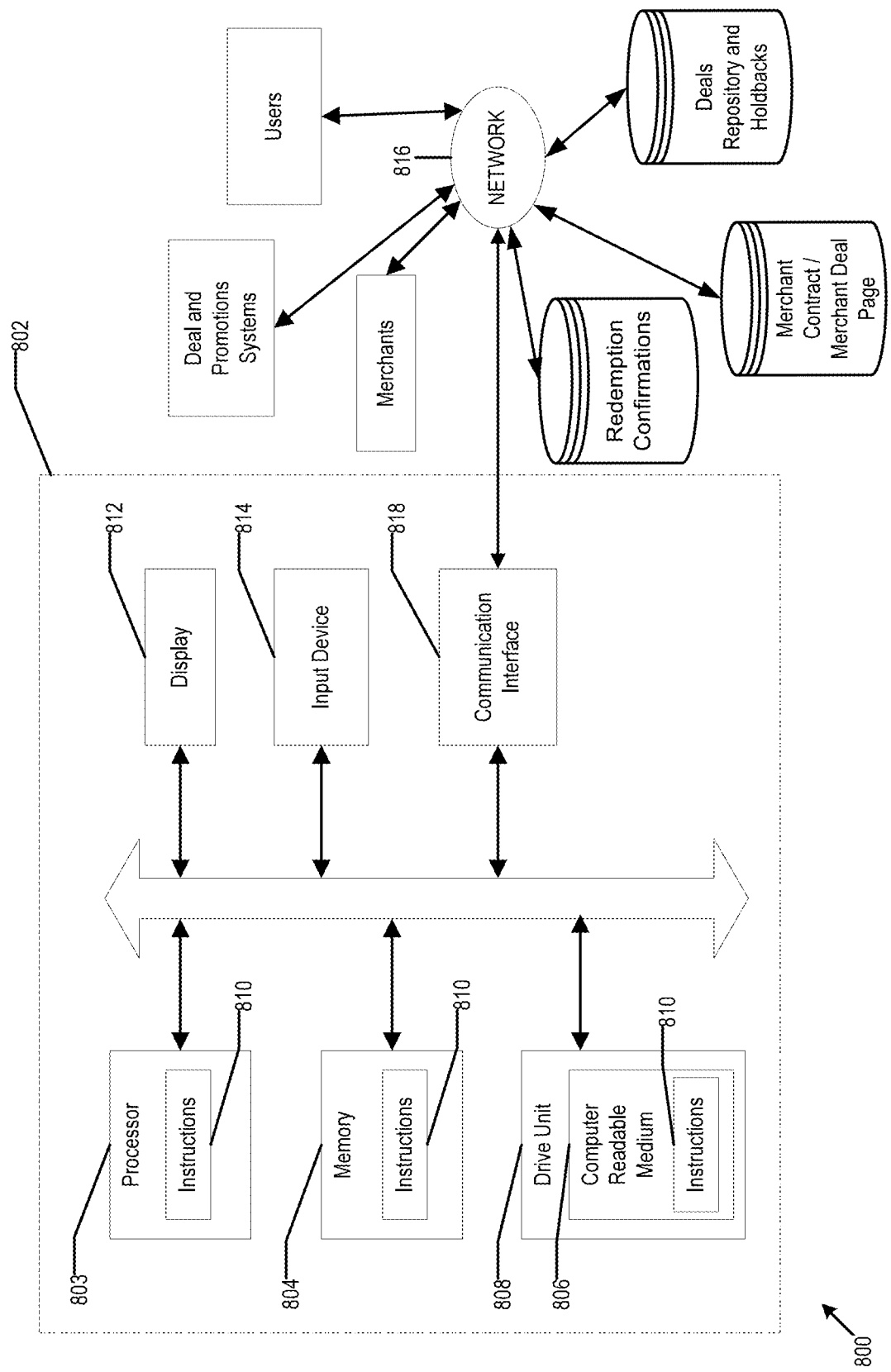
FIG. 8 shows a configuration of the unified payment and ROI system.

FIG. 8 shows configuration 800 of the unified payment and ROI system 802. The unified payment system 802 may be deployed as a general computer system used in a networked deployment. The unified payment system 802 may represent a remote server or local mobile device of the user. In other words, the unified payment logic may be executed by one or more processors locally or remotely located. The computer system may operate as a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 810 (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 803, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories 804 discussed herein, as well as the claims below, may be embodied in and implemented in one or multiple physical chips or circuit combinations. The processor 803 may execute a software program 810, such as code generated manually (i.e., programmed).

The computer system 802 may include a memory 804 that can communicate via a bus. The memory 804 may be a main memory, a static memory, or a dynamic memory. The memory 804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 804 may include a cache or random access memory for the processor. Alternatively or in addition, the memory 804 may be separate from the processor, such as a cache memory of a processor, the memory, or other memory. The memory 804 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 804 may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 812, such as a liquid crystal display (LCD), an organic light emitting diode (OLED), a flat panel display, a solid state display, a cathode ray tube (CRT), a projector, a printer or other now known or later developed display device for outputting determined information. The display 812 may act as an interface for the user to see the functioning of the processor, or specifically as an interface with the software stored in the memory or in the drive unit.

Additionally, the computer system may include an input device 814 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit 808 may include a computer-readable medium 806 in which one or more sets of instructions, e.g. software, can be embedded. Further, the instructions may perform one or more of the methods or logic as described herein. The instructions may reside completely, or at least partially, within the memory 804 and/or within the processor during execution by the computer system. The memory 804 and the processor also may include computer-readable media as discussed above.

The present disclosure contemplates a computer-readable medium 806 that includes instructions or receives and executes instructions responsive to a propagated signal, so that a device connected to a network 816 may communicate voice, video, audio, images or any other data over the network 816. Further, the instructions may be transmitted or received over the network 816 via a communication interface 818. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system 802 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium 806 may be a single medium, or the computer-readable medium 806 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 806 may include a solid-state memory such as a memory card or other package that houses one or more non-volatile read-only memories. The computer-readable medium 806 also may be a random access memory or other volatile re-writable memory. Additionally, the computer-readable medium 806 may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium 806 may comprise a tangible storage medium. The computer-readable medium 806 may comprise a non-transitory medium in that it cannot be construed to refer to carrier signals or propagating waves. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. An apparatus for dynamically calculating a holdback amount to retain from a sale price of a promotion from immediate disbursement to a provider of a good or service associated with the promotion, and instead to provide in accordance with a payment schedule, the apparatus comprising at least one processor and at least one non-transitory memory including computer program code, the at least one non-transitory memory and the computer program code configured to, with the at least one processor, cause the apparatus to:

receive, via a communication interface, over a network, a notice of sale of a promotion, the notice including a sale amount, wherein the promotion is associated with a feature period at which the promotion is offered for sale and an expiration date at which the promotion is no longer offered for sale;

calculate, by a processor, based on the sale amount, a holdback amount from the sale amount to hold in reserve and a payment amount to distribute to a merchant, wherein the holdback amount is automatically determined, adjusted, and documented in real-time to reflect each of a plurality of new terms, wherein the calculation is dynamically updated in real-time based on a configurable percentage of the sale amount, an expiration date of the promotion, a number of unredeemed vouchers, a length of a redemption period, and a velocity of redemptions;

generate, by the processor, the payment schedule, configured for display on a user device via a renderable graphical user interface, for transferring funds to the merchant, wherein generation of the payment schedule comprises:

determination of a start date of the feature period at which the promotion was offered for sale and the expiration date at which the promotion was no longer offered for sale;

for each sale of the promotion, determination of a sale date indicative of a date at which the sale was made; and determination of the payment amount based on a predefined value of the configurable percentage, an initial payment date, and a date on which to process the holdback amount, wherein the initial payment is scheduled for a configurable number of days following the start of the feature period, and wherein the date on which to process the holdback amount is based on the expiration date of the promotion, such that payments are made on a recurring basis; and cause initiation of each of a plurality of transfers in accordance with the payment schedule, wherein in accordance with the payment schedule, for each promotion, each scheduled payment amount comprises a predetermined portion of the total amount due to the merchant from a previous feature period and any remaining balance including a second predetermined portion for each period, less any refunds, due as a result of the expiration of promotions within that period, and wherein changes to the payment schedule are made in real-time and provided via a live graphical representation, collaboratively built responsive to values received from the user device or the apparatus.

2. The apparatus of claim 1, wherein the holdback amount and the payment amount are based on one or more of a configurable percentage of the sale amount, an expiration date of the promotion, a number of unredeemed vouchers, industry trends, and a category of promotion.

3. The apparatus of claim 1, wherein the payment schedule indicates a date on which to transfer the payment amount and a date on which to process the holdback amount.

4. The apparatus of claim 3, wherein the at least one memory and the computer program code are further configured to, with the at least one processor, cause the apparatus to initiate a transfer of the payment amount to the merchant based on the payment schedule.

5. The apparatus of claim 3, wherein the date on which to process the holdback amount is based on the expiration date of the promotion.

6. The apparatus of claim 3, wherein the at least one memory and the computer program code are further configured to, with the at least one processor, cause the processor to process the holdback amount by:

determining an amount of money returned to consumers; and calculating a remaining balance by subtracting the refund amount from the holdback amount.

7. The apparatus of claim 6, wherein the at least one memory and the computer program code are further configured to, with the at least one processor, cause the processor to initiate a transfer of the remaining balance to the merchant.

8. The apparatus of claim 1, wherein the at least one memory and the computer program code are further configured to, with the at least one processor, cause the apparatus to calculate the holdback amount by:

retrieving a holdback buffer level, identifying whether the holdback buffer level is static or dynamic, and determining the holdback amount based on the sale amount, the holdback buffer level, and the identification of whether the holdback buffer level is static or dynamic.

9. A method for dynamically calculating a holdback amount to retain from a sale price of a promotion from immediate disbursement to a provider of a good or service associated with the promotion, and instead to provide in accordance with a payment schedule, the method comprising:

receiving, via a communication interface, over a network, a notice of sale of a promotion, the notice including a sale amount, wherein the promotion is associated with a feature period at which the promotion is offered for sale and an expiration date at which the promotion is no longer offered for sale;

calculating, by a processor, based on the sale amount, a holdback amount from the sale amount to hold in reserve and a payment amount to distribute to a merchant, wherein the holdback amount is automatically determined, adjusted, and documented in real-time to reflect each of a plurality of new terms, wherein the calculation is dynamically updated in real-time based on a length of a redemption period, a velocity of redemptions and a velocity of refunds, and a previous performance of an issuing merchant;

generating, via the processor, the payment schedule, configured for display on a user device via a renderable graphical user interface, for transferring funds to the merchant, wherein generation of the payment schedule comprises:

determination of a start date of the feature period at which the promotion was offered for sale and the expiration date at which the promotion was no longer offered for sale;

determination of a sale date indicative of a date at which the sale was made; and determination of the payment amount, an initial payment date, and a date on which to process the holdback amount, wherein the initial payment is scheduled for a configurable number of days following the start of the feature period, and wherein the date on which to process the holdback amount is based on the expiration date of the promotion, such that payments are made on a recurring basis; and causing initiation of each of a plurality of transfers in accordance with the payment schedule, wherein in accordance with the payment schedule, for each promotion, each scheduled payment amount comprises a predetermined portion of the total amount due to the merchant from a previous feature period and any remaining balance including a second predetermined portion for each period, less any refunds, due as a result of the expiration of promotions within that period, and wherein changes to the payment schedule are made in real-time and provided via a live graphical representation, collaboratively built responsive to values received from the user device or a promotion system.

10. The method of claim 9, wherein the holdback amount and the payment amount are based on one or more of a configurable percentage of the sale amount, an expiration date of the promotion, a number of unredeemed vouchers, industry trends, and a category of promotion.

11. The method of claim 9, wherein the payment schedule indicates a date on which to transfer the payment amount and a date on which to process the holdback amount.

12. The method of claim 11, further comprising initiating a transfer of the payment amount to the merchant based on the payment schedule.

13. The method of claim 11, wherein the date on which to process the holdback amount is based on the expiration date of the promotion.

14. The method of claim 11, further comprising processing the holdback amount by:
   determining an amount of money returned to consumers; and
   calculating a remaining balance by subtracting the refund amount from the holdback amount.

15. The method of claim 14 further comprising initiating a transfer of the remaining balance to the merchant.

16. The method of claim 9, wherein calculating the holdback amount includes:
   retrieving a holdback buffer level;
   identifying whether the holdback buffer level is static or dynamic; and
   determining the holdback amount based on the sale amount, the holdback buffer level, and the identification of whether the holdback buffer level is static or dynamic.

17. A computer program product for dynamically calculating a holdback amount to retain from a sale price of a promotion from immediate disbursement to a provider of a good or service associated with the promotion, and instead to provide in accordance with a payment schedule, the computer program product comprising a non-transitory computer readable medium storing computer readable instructions, the computer readable instructions configured, when executed by a processor, to cause the processor to:
   receive, via a communication interface, over a network, a notice of sale of a promotion, the notice including a sale amount,
   wherein the promotion is associated with a feature period at which the promotion is offered for sale and an expiration date at which the promotion is no longer offered for sale;
   calculate, by a processor, based on the sale amount, a holdback amount from the sale amount to hold in reserve and a payment amount to distribute to a merchant,
   wherein the holdback amount is automatically determined, adjusted, and documented in real-time to reflect each of a plurality of new terms, wherein the calculation is dynamically updated in real-time based on a length of a redemption period, a velocity of redemptions and a velocity of refunds, and a previous performance of an issuing merchant;
   generate, by the processor, the payment schedule, configured for display on a user device via a renderable graphical user interface, for transferring funds to the merchant,
   wherein generation of the payment schedule comprises:
   determination of a start date of the feature period at which the promotion was offered for sale and the expiration date at which the promotion was no longer offered for sale;
   determination of a sale date indicative of a date at which the sale was made; and
   determination of the payment amount, an initial payment date, and a date on which to process the holdback amount,
   wherein the initial payment is scheduled for a configurable number of days following the start of the feature period, and
   wherein the date on which to process the holdback amount is based on the expiration date of the promotion, such that payments are made on a recurring basis; and
   cause initiation of each of a plurality of transfers in accordance with the payment schedule, wherein in accordance with the payment schedule, for each promotion, each scheduled payment amount comprises a predetermined portion of the total amount due to the merchant from a previous feature period and any remaining balance including a second predetermined portion for each period, less any refunds, due as a result of the expiration of promotions within that period, and
   wherein changes to the payment schedule are made in real-time and provided via a live graphical representation, collaboratively built responsive to values received from the user device or a promotion system.

18. The computer program product of claim 17, wherein the holdback amount and the payment amount are based on one or more of a configurable percentage of the sale amount, an expiration date of the promotion, a number of unredeemed vouchers, industry trends, and a category of promotion.

19. The computer program product of claim 17, wherein the payment schedule indicates a date on which to transfer the payment amount and a date on which to process the holdback amount.

20. The computer program product of claim 19, wherein the computer readable instructions are further configured, when executed by the processor, to cause the processor to: initiate a transfer of the payment amount to the merchant based on the payment schedule.

21. The computer program product of claim 19, wherein the date on which to process the holdback amount is based on the expiration date of the promotion.

22. The computer program product of claim 19, wherein the computer readable instructions are further configured, when executed by the processor, to cause the processor to process the holdback amount by:
   determining an amount of money returned to consumers; and
   calculating a remaining balance by subtracting the refund amount from the holdback amount.

23. The computer program product of claim 22, wherein the computer readable instructions are further configured, when executed by the processor, to cause the processor to initiate a transfer of the remaining balance to the merchant.

24. The computer program product of claim 17, wherein the computer readable instructions are further configured, when executed by the processor, to cause the processor to calculate the holdback amount by:
   retrieving a holdback buffer level,
   identifying whether the holdback buffer level is static or dynamic, and
   determining the holdback amount based on the sale amount, the holdback buffer level, and the identification of whether the holdback buffer level is static or dynamic.

* * * * *